United States Patent
Jacobi et al.

(10) Patent No.: US 11,584,889 B2
(45) Date of Patent: Feb. 21, 2023

(54) SYNTHETIC SOURCE ROCK WITH TEA

(71) Applicant: Saudi Arabian Oil Company, Dhahran (SA)

(72) Inventors: David Jacobi, Houston, TX (US); Katherine Leigh Hull, Houston, TX (US); Younane N. Abousleiman, Norman, OK (US); Poorna Srinivasan, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/550,025

(22) Filed: Dec. 14, 2021

(65) Prior Publication Data
US 2022/0213387 A1 Jul. 7, 2022

Related U.S. Application Data

(60) Provisional application No. 63/133,480, filed on Jan. 4, 2021.

(51) Int. Cl.
*B09B 3/40* (2022.01)
*C10B 57/16* (2006.01)
*B09B 101/70* (2022.01)

(52) U.S. Cl.
CPC ............... *C10B 57/16* (2013.01); *B09B 3/40* (2022.01); *B09B 2101/70* (2022.01)

(58) Field of Classification Search
CPC ....... C10B 57/16; B09B 3/40; B09B 2101/70; C09K 8/58
USPC .......................................................... 44/607
See application file for complete search history.

(56) References Cited

U.S. PATENT DOCUMENTS

| | | |
|---|---|---|
| 3,072,502 A | 1/1963 | Salvatore |
| 3,284,281 A | 11/1966 | Thomas |
| 3,616,855 A | 11/1971 | Colgate |
| 3,807,557 A | 4/1974 | Miller |
| 3,912,330 A | 10/1975 | Carnahan et al. |
| 3,926,575 A | 12/1975 | Meyers |
| 3,996,062 A | 12/1976 | Frost |
| 4,043,599 A | 8/1977 | Lingane |
| 4,043,885 A | 8/1977 | Yen et al. |
| 4,223,726 A | 9/1980 | Cha |
| 4,289,639 A | 9/1981 | Buske |

(Continued)

FOREIGN PATENT DOCUMENTS

| | | |
|---|---|---|
| CN | 101916522 | 12/2010 |
| CN | 102015959 | 4/2011 |

(Continued)

OTHER PUBLICATIONS

PCT International Search Report and Written Opinion in International Appln. No. PCT/US2022/011161, dated Apr. 4, 2022, 16 pages.

(Continued)

*Primary Examiner* — Cephia D Toomer
(74) *Attorney, Agent, or Firm* — Fish & Richardson P.C.

(57) ABSTRACT

A synthetic source rock including roasted tea powder and inorganic material. A technique for preparing the synthetic source rock, including grinding tea leaves to give tea powder, roasting the tea powder at a roasting temperature to give a roasted tea powder, and determining composition and porosity of the roasted tea powder.

16 Claims, 18 Drawing Sheets

(56) References Cited

U.S. PATENT DOCUMENTS

| | | | |
|---|---|---|---|
| 4,324,560 | A | 4/1982 | Fonseca |
| 4,381,950 | A | 5/1983 | Lawson |
| 4,589,490 | A | 5/1986 | Darr et al. |
| 4,594,170 | A | 6/1986 | Brown et al. |
| 4,640,692 | A | 2/1987 | Audeh |
| 4,959,401 | A | 9/1990 | Bellasalma et al. |
| 5,224,543 | A | 7/1993 | Watkins |
| 5,232,490 | A | 8/1993 | Bender et al. |
| 5,905,657 | A | 5/1999 | Celniker |
| 6,138,760 | A | 10/2000 | Lopez et al. |
| 6,488,091 | B1 | 12/2002 | Weaver |
| 6,494,263 | B2 | 12/2002 | Todd |
| 6,866,048 | B2 | 3/2005 | Mattox |
| 6,942,840 | B1 | 9/2005 | Broderick |
| 6,989,391 | B2 | 1/2006 | Funkhouser |
| 7,706,981 | B2 | 4/2010 | Wilkinson et al. |
| 7,770,647 | B2 | 8/2010 | Watson et al. |
| 8,225,866 | B2 | 7/2012 | Rouffignac et al. |
| 8,839,860 | B2 * | 9/2014 | Wigand .................. C10G 1/04 166/272.6 |
| 8,851,177 | B2 | 10/2014 | Wigand |
| 8,865,482 | B2 | 10/2014 | Wang et al. |
| 8,936,089 | B2 | 1/2015 | Wigand |
| 9,033,033 | B2 | 5/2015 | Thomas et al. |
| 9,244,182 | B2 | 1/2016 | Loseth et al. |
| 9,552,462 | B2 | 1/2017 | Walters et al. |
| 9,834,721 | B2 | 12/2017 | Chang et al. |
| 9,863,231 | B2 | 1/2018 | Hull et al. |
| 10,329,478 | B2 | 6/2019 | Schnoor et al. |
| 10,351,758 | B2 | 7/2019 | Hull et al. |
| 10,435,617 | B2 | 10/2019 | Hull et al. |
| 10,472,555 | B2 | 11/2019 | Hutchins et al. |
| 10,479,927 | B2 | 11/2019 | Hull et al. |
| 10,753,190 | B1 * | 8/2020 | Schipper .................. C09K 8/80 |
| 10,781,360 | B2 | 9/2020 | Hull et al. |
| 10,900,339 | B2 | 1/2021 | Schipper et al. |
| 11,143,008 | B1 * | 10/2021 | Haque .................. E21B 43/267 |
| 11,186,806 | B2 | 11/2021 | Hull |
| 11,236,020 | B2 * | 2/2022 | Haque .................. C04B 28/006 |
| 2004/0101457 | A1 | 5/2004 | Pahlman et al. |
| 2007/0298979 | A1 | 12/2007 | Perry et al. |
| 2008/0070806 | A1 | 3/2008 | Lin et al. |
| 2009/0044945 | A1 | 2/2009 | Wilberg et al. |
| 2009/0143252 | A1 | 6/2009 | Lehmann |
| 2009/0203557 | A1 | 8/2009 | Barnes et al. |
| 2009/0308793 | A1 * | 12/2009 | Van Der Merwe ...... B01J 20/20 208/402 |
| 2009/0313772 | A1 | 12/2009 | Talley |
| 2010/0010106 | A1 | 1/2010 | Crews |
| 2010/0258265 | A1 | 10/2010 | Karanikas et al. |
| 2010/0276142 | A1 | 11/2010 | Skildum et al. |
| 2012/0247774 | A1 | 10/2012 | Li et al. |
| 2013/0056213 | A1 | 3/2013 | Medvedev et al. |
| 2013/0160994 | A1 | 6/2013 | Alsop et al. |
| 2013/0161002 | A1 | 6/2013 | Wigand |
| 2014/0045732 | A1 | 2/2014 | Ar |
| 2014/0374104 | A1 | 12/2014 | Kushal |
| 2015/0203739 | A1 * | 7/2015 | Talley .................. C11D 3/3942 166/227 |
| 2015/0300140 | A1 | 10/2015 | Eoff et al. |
| 2016/0061017 | A1 | 3/2016 | Nguyen et al. |
| 2016/0289543 | A1 | 10/2016 | Chang et al. |
| 2016/0362965 | A1 | 12/2016 | Parlar |
| 2017/0066959 | A1 * | 3/2017 | Hull .................. E21B 43/26 |
| 2017/0067836 | A1 * | 3/2017 | Hull .................. G01V 5/00 |
| 2018/0112126 | A1 | 4/2018 | Yang et al. |
| 2018/0230361 | A1 * | 8/2018 | Foster .................. C09K 8/62 |
| 2018/0319708 | A1 | 11/2018 | Haque et al. |
| 2018/0328905 | A1 * | 11/2018 | Jacobi .................. G01N 33/241 |
| 2020/0340342 | A1 * | 10/2020 | Schipper .................. C21B 13/00 |
| 2021/0198558 | A1 * | 7/2021 | Hull .................. C09K 8/64 |
| 2021/0263006 | A1 * | 8/2021 | Hull .................. G01N 33/241 |
| 2022/0170365 | A1 * | 6/2022 | Hull .................. G01N 15/088 |

FOREIGN PATENT DOCUMENTS

| | | |
|---|---|---|
| CN | 102220116 | 10/2011 |
| CN | 105219948 | 1/2016 |
| CN | 109239308 | 1/2019 |
| CN | 110702477 | 1/2020 |
| WO | WO 2003095382 | 11/2003 |
| WO | WO 2004005435 | 1/2004 |
| WO | WO 2013149122 | 10/2013 |
| WO | WO 2015041669 | 3/2015 |
| WO | WO 2016089813 | 6/2016 |
| WO | WO 2017161157 | 9/2017 |
| WO | WO 2018118024 | 6/2018 |
| WO | WO 2018170065 | 9/2018 |

OTHER PUBLICATIONS

Anderson et al., "RockFlow: Fast Generation of Synthetic Source Rock Images Using Generative Flow Models," energies, Dec. 2020, 19 pages.

Bell et al., "Molecular Level Study of Hot Water Extracted Green Tea Buried in Soils—a Proxy for Labile Soil Organic Matter," Scientific Reports, Jan. 2020, 10:1 (1-13), 13 pages.

Beloborodov et al., "Compaction Trends of Full Stiffness Tensor and Fluid Permeability in Artificial Shales," Geophysical Journal International, Mar. 2018, 212:3 (1687-1693), 7 pages.

Borah et al., "Preparation of Ordered Porous Carbon from Tea by Chemical Activation and Its Use in Cr(VI) Adsorption," Journal of Porous Materials, Oct. 2012, 19:5 (767-774), 8 pages.

Brochard et al., "Fracture Properties of Kerogen and Importance for Organic-Rich Shales," Annual World Conference on Carbon (Carbon 2013), Jul. 2013, 5 pages.

Cai et al., "Thermal Degradations and Processes of Waste Tea and Tea Leaves via TG-FTIR: Combustion Performances, Kinetics, Thermodynamics, Products and Optimization," Bioresource Technology, Nov. 2018, 268:715-25, 36 pages.

Choi et al., "Enhanced Lithium Storage in Hierarchically Porous Carbon Derived from Waste Tea Leaves," Scientific Reports, Dec. 2016, 6:1 (1-10), 10 pages.

Clough et al., "Characterization of Kerogen and Source Rock Maturation Using Solid-State NMR Spectroscopy," Energy & Fuels, 2015, 29:10 (6370-6382), 42 pages.

Daneshy, "Hydraulic Fracturing to Improve Production," Tech 101, TheWayAhead, vol. 6, No. 3, Oct. 2010, 4 pages.

Dor et al., "Assembly of Clay Mineral Platelets, Tactoids, and Aggregates: Effect of Mineral Structure and Solution Salinity," Journal of Colloid and Interface Science, Apr. 2020, 566:163-170, 8 pages.

Ho et al., "Tea Aroma Formation," Food Science and Human Wellness, Mar. 2015, 4:1 (9-27), 37 pages.

Hydraulic Fracturing Fluid Product Component Information Disclosure, Process Energy Canada Ltd., Jan. 2012, 2 pages.

Luan et al., "Creation of synthetic samples for physical modelling of natural shale," Geophysical Prospecting, vol. 64, Issue 4—Advances in Rock Physics, Jun. 2016, 898-914, 17 pages.

Montgomery, "Chapter 2: Fracturing Fluid Components," Intech open science | open minds, Montgomery, 2013, 21 pages.

Sengupta et al., "Modeling and estimation of kerogen evolution in source rocks," SEG-2020-3425803, SEG Technical Program Expanded Abstracts, Sep. 2020, 5 pages.

Wang et al., "Iron Sulfide Scale Dissolvers: How Effective are They?", SPE 168063, Society of Petroleum Engineers, presented at the SPE Saudi Arabia section Annual Technical Symposium and Exhibition, May 19-22, 2013, 22 pages.

Zhou et al., "Three-Dimensional Hierarchical Porous Carbon Cathode Derived from Waste Tea Leaves for the Electrocatalytic Degradation of Phenol," Langmuir, Oct. 2019, 35:4 (12914-12926), 13 pages.

* cited by examiner

800 — BET Nitrogen Adsorption of Heiarchal Carbon from Tea

| Sample | BET Surface Area ($m^2 g^{-1}$) | Total Pore Volume (p/$P_0$=0.988, $cm^3 g^{-1}$) | Average Pore Diameter (nm) |
|---|---|---|---|
| Crushed TW | 0.07 | 0.0003 | 18.7 |
| TW-Car | 4.99 | 0.0071 | 5.69 |
| HCl-TW-Car | 337.71 | 0.2098 | 2.48 |

FIG. 8A

802 — BET Nitrogen Adsorption of Kerogen

| Sample | $f_{Ar}^{Ker}$ | Surface Area ($m^2/g$) | Pore Volume (cc/g) |
|---|---|---|---|
| Ker-A | 0.32 | 12.2 | 0.05 |
| Ker-B | 0.66 | 15.1 | 0.10 |
| Ker-E | 0.87 | 46.9 | 0.19 |
| Ker-F | 0.89 | 93.2 | 0.33 |

FIG. 8B

SYNTHETIC SOURCE ROCK WITH TEA

CROSS-REFERENCE TO RELATED APPLICATIONS

This application claims the benefit of U.S. Provisional Application Ser. No. 63/133,480, filed Jan. 4, 2021, the entire contents of which are incorporated herein by reference in its entirety.

TECHNICAL FIELD

This disclosure relates to synthetic source rock for simulating source rock of unconventional formations.

BACKGROUND

Hydraulic fracturing may allow for the recovery of crude oil and natural gas from unconventional formations that geologists once believed were impossible to produce. Although unconventional (e.g., shale) rock formations or reservoirs are porous composites, their very small pore sizes and low permeability (e.g., less than 1 millidarcy) make them relatively resistant to economical hydrocarbon flow without hydraulic fracturing or stimulation.

Source rocks of unconventional formations may be fine-grained, organic-rich sedimentary deposits, such as shales and mud rocks. Source rocks of unconventional formations may be compositionally diverse and a complex interwoven structure of inorganic and organic materials. The organic material typically includes kerogen.

Unconventional formations generally include the organic material (e.g., kerogen) intertwined with the rock matrix and the pores. In some circumstances, high-yield unconventional formations may be characterized or labeled as a kerogen-rich shale (KRS). The organic components of the source shale may include the hydrocarbon-source material kerogen and kerogen-produced components bitumen and pyrobitumen. Kerogen is a solid organic matter in sedimentary rocks, and is a natural organic biopolymer of irregular structure. Kerogen can range in degree of saturation where the ratio of the aliphatic to aromatic content contributes to thermal maturity designations. Kerogen is insoluble in normal organic solvents because of its high molecular weight. Upon significant heating, kerogen may convert to liquid or gaseous hydrocarbons.

SUMMARY

An aspect relates to a method of preparing synthetic source rock with tea. The method includes grinding tea leaves to give tea powder, roasting the tea powder at a roasting temperature to give a roasted tea powder, determining composition of the roasted tea powder via elemental analysis, and determining porosity of the roasted tea powder.

Another aspect is a method of preparing synthetic source rock having tea. The method includes drying and grinding tea leaves to give tea powder, determining composition and porosity of the tea powder, roasting the tea powder at a roasting temperature to give a roasted tea powder, and forming a synthetic source rock having the roasted tea powder.

Yet another aspect is a method of preparing synthetic source rock having tea. The method includes grinding tea leaves to give tea powder, determining chemical composition of the tea powder via elemental analysis, determining porosity of the tea powder, specifying a roasting temperature via thermal gravimetric analysis (TGA) of the tea powder, and roasting the tea powder at the roasting temperature as specified to give a roasted tea powder.

Yet another aspect is a synthetic source rock including roasted tea powder (analogous to kerogen in a subterranean formation) and inorganic material, wherein the synthetic source rock is configured to be utilized to evaluate the subterranean formation.

The details of one or more implementations are set forth in the accompanying drawings and the description below. Other features and advantages will be apparent from the description and drawings, and from the claims.

BRIEF DESCRIPTION OF DRAWINGS

FIG. 8A is a first table indicating that that porosity can be measured using Brunauer, Emmet, and Teller (BET) nitrogen adsorption.

FIG. 8B is a second table that that porosity can be measured using BET nitrogen adsorption.

DETAILED DESCRIPTION

Figure 1:
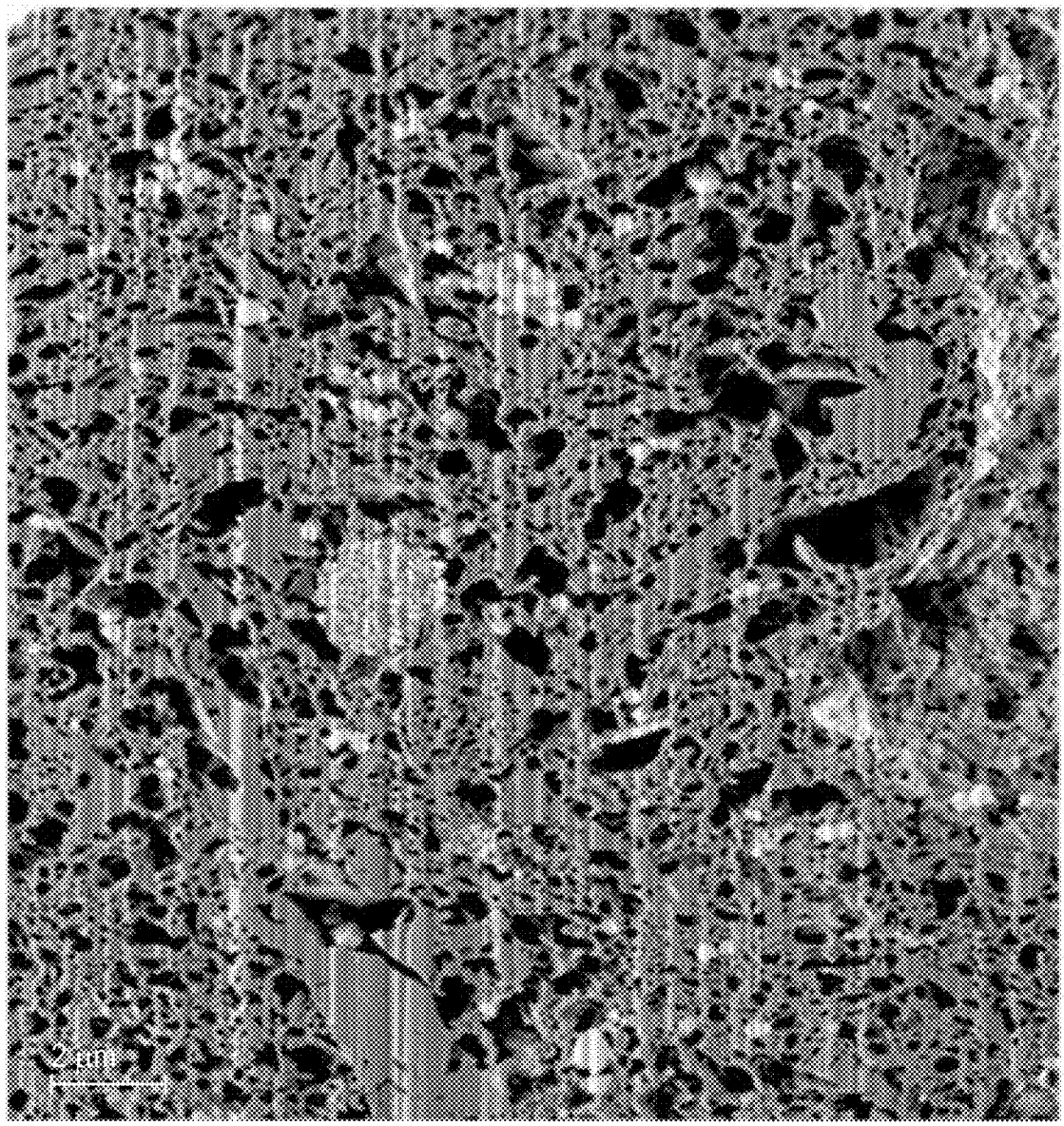
FIG. 1 is an image of a sample of mature kerogen that was recovered.

Some aspects of the present disclosure are directed to synthetic source rock having roasted tea and inorganic material. The roasted tea may be a substitute for organic material, such as kerogen. The roasted tea may be roasted tea powder. The tea powder may be ground tea leaves. The tea leaves may be leaves of a tea plant or *Camellia sinensis* plant. The inorganic material may include minerals. The synthetic source rock may be utilized to evaluate a subterranean formation, such as an unconventional (e.g., shale) formation.

The synthetic source rock may be utilized to evaluate the subterranean formation. For instance, a synthetic source rock can be employed to emulate the surface area and structure of a rock based on known properties of the matrices that is not sometime easy to measure in natural rocks because of their complexity. Therefore, a synthetic rock can be utilized to understand more about how gas adsorption occurs because the surface area of the minerals and organic matter are known a priori. The mechanical properties of the minerals and organic matter that control structural integrity are also known, so elastic moduli of the rock can be determined to predict whether that integrity will either hold or fail under pressure. In contrast, for a natural source rock where an agglomeration of inorganic and organic components are laminated together through sedimentation and lithification, understanding what individual components are contributing to gas adsorption or mechanical moduli may be difficult to discern.

Embodiments may decide or specify what "maturity" of roasted tea to include in the synthetic source rock. In certain implementations, the kerogen maturity in an actual source rock may be analyzed, and then that maturity duplicated with the roasted tea in the synthetic source rock. Source rocks (actual) may mature with increasing temperature in subsurface burial, and the source rock porosity may progressively increase. Similarly, the maturity of roasted tea is due to increasing temperature that also can also increase porosity. Therefore, analyzing known source rocks of different maturity allows you to then to recover the kerogen to measure the corresponding porosity, all of which may then be utilized to guide the preparation of roasted tea according to certain increasing temperatures.

A constituent of a source rock of an unconventional formation may be kerogen. Kerogen is an organic macromolecular polymer that is a source of hydrocarbons over time as the kerogen matures. Hydrocarbons (crude oil and natural gas) form from kerogen. The chemical and mechanical elastomeric properties of kerogen can significantly influence and hinder the ability to hydraulically fracture a source rock to recover hydrocarbons from an unconventional reservoir. This, in part, is because the steady generation of hydrocarbons from kerogen alters the kerogen in-situ mechanical and chemical properties of macerals composing kerogen that lead to physical changes in both the kerogen surface area and porosity, as well as the kerogen chemical structure and molecular packing density. These changes have been demonstrated experimentally to have the potential of decreasing the efficiency of hydraulic fracturing. Understanding such may be valuable information that could be utilized as a guide to help change fracture design programs. However, measurement of these changing properties directly (to learn the effect of kerogen on bulk rock mechanics) may be difficult because of the complexity of the very-fine grained, rock fabric. To understand this effect of kerogen on bulk rock mechanics, synthetic source rocks (as substitutes) having organic substrates as a proxy for kerogen may be developed. In some instances, utilization of kerogen recovered from acid rock digestion may be considered in development of the source-rock substitutes. However, substitutes may lack the physical and chemical properties of kerogen that accompany kerogen transformation. Moreover, the use of recovered kerogen for rock synthesis can be difficult because of the volume of rock to recover adequate amounts of kerogen. In other words, rocks may only contain, for example, 5-10 weight percent (wt %) kerogen. This limited fraction could reduce the number of trials for developing a successful rock synthesis formula. Recovering adequate amounts of kerogen to develop a representative source rock texture may also involve the destruction and digestion of valuable rock core which could be a waste of a limited resource. Lastly, the cost of recovering kerogen from rock may be expensive because of the chemicals implemented for digestion, posing yet another disadvantage that would suggest alternatives to recovered kerogen should be considered.

In response to these challenges and other factors, "tea" may be implemented in embodiments herein as a natural proxy to substitute for kerogen to provide a comparable organic polymer for developing synthetic source-rock formulations. The structure of tea leaves can serve as a proxy (stand-in, substitute, etc.) of kerogen because tea leaves can be treated chemically and physically roasted (before incorporation into the synthetic source-rock) or in situ within a synthetic source-rock fabric. This may produce a hierarchical porous carbon whose pore structure, surface area, and mechanical and chemical properties, are similar to kerogen as kerogen matures. The mechanical properties may include, for example, Young's modulus and Poisson's ratio from elastic moduli. The chemical properties may include, for example, elemental analysis for H/C, O/C and S/C relied on for determining maturity and composition. Utilized either as a raw material or as a waste product, tea of most or all types is generally a cost-effective substitute for kerogen in source-rock synthesis applications.

Hierarchical porous carbon may be a structured aromatic carbon molecule that is highly aromatic. Hierarchical porous carbon may be highly structured, porous, aromatic polyatomic organic structure, synthesized by high temperature. The term "hierarchical porous carbon" may be given the acronym "HPC".

FIG. 1 is an image of a sample of mature kerogen that was recovered. The image indicates porosity in kerogen isolated from the rock. The image indicates kerogen porosity. The magnification is 3,050 times. The pixel size of the image as captured was 36.63 nanometers (nm). The scale bar at the lower left below the image is 2 microns (μm). The image represents a height of the sample of 28.13 μm and a width of the sample of 37.51 μm.

Kerogen loses volume due to its volatility as the kerogen matures to produce hydrocarbons, which is manifested by porosity created within the polymer itself, as indicated in FIG. 1. This porosity increases with maturity and the corresponding loss of volume accompanies a change in the kerogen chemical structure as the kerogen loses a higher proportion of hydrogen relative to carbon and becomes more aromatic. See, for example, FIG. 2.

Figure 2:
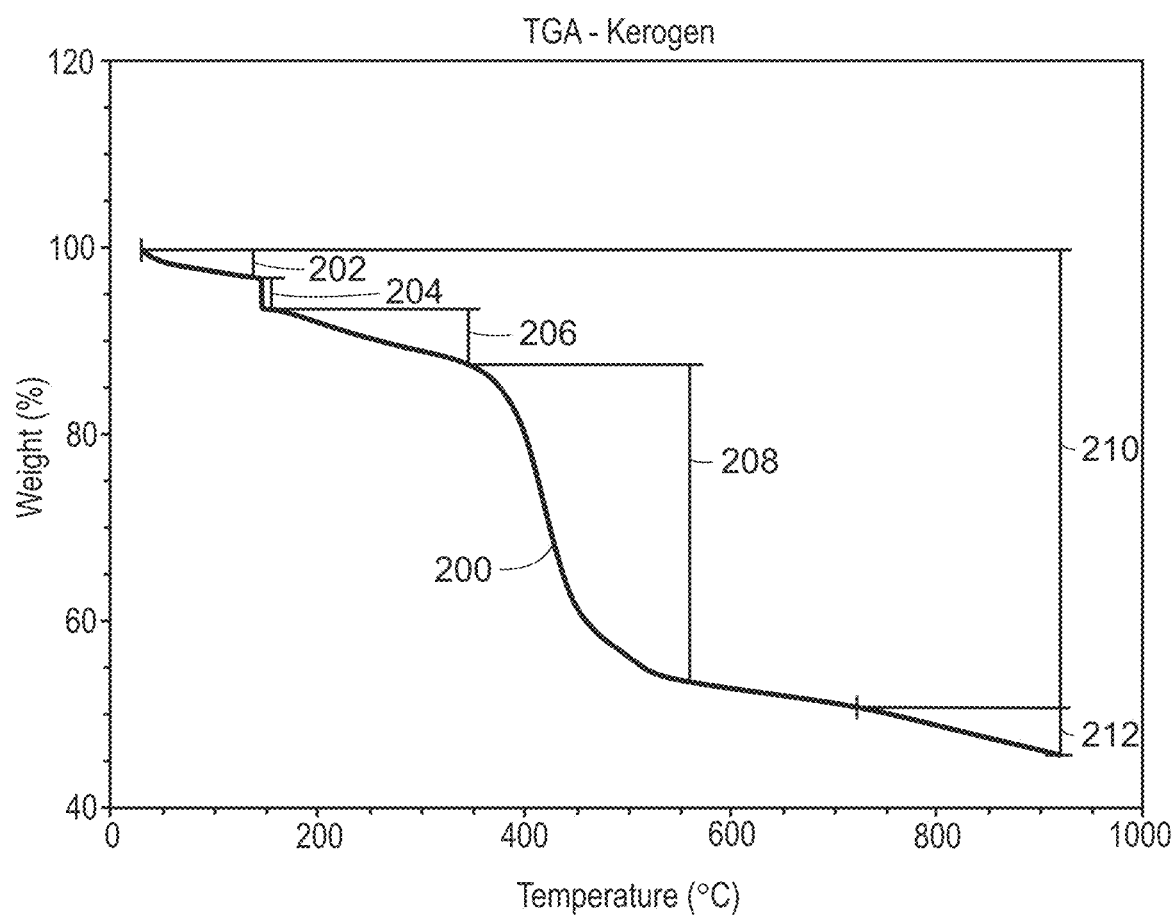
FIG. 2 is a plot of thermal gravimetric analysis (TGA) of kerogen.

FIG. 2 is a plot of thermal gravimetric analysis (TGA) of kerogen indicating this transformation and degree of volatility that can be monitored according to the weight loss from the polymer as a function of temperature and time. The plot gives weight loss over temperature. The plot is kerogen percent (%) of weight versus temperature (° C.) in the TGA. The curve 200 is the TGA curve. Reference lines annotating the TGA curve 200 note weight loss in percent and milligrams (mg) for particular temperature increments.

Figure 3:
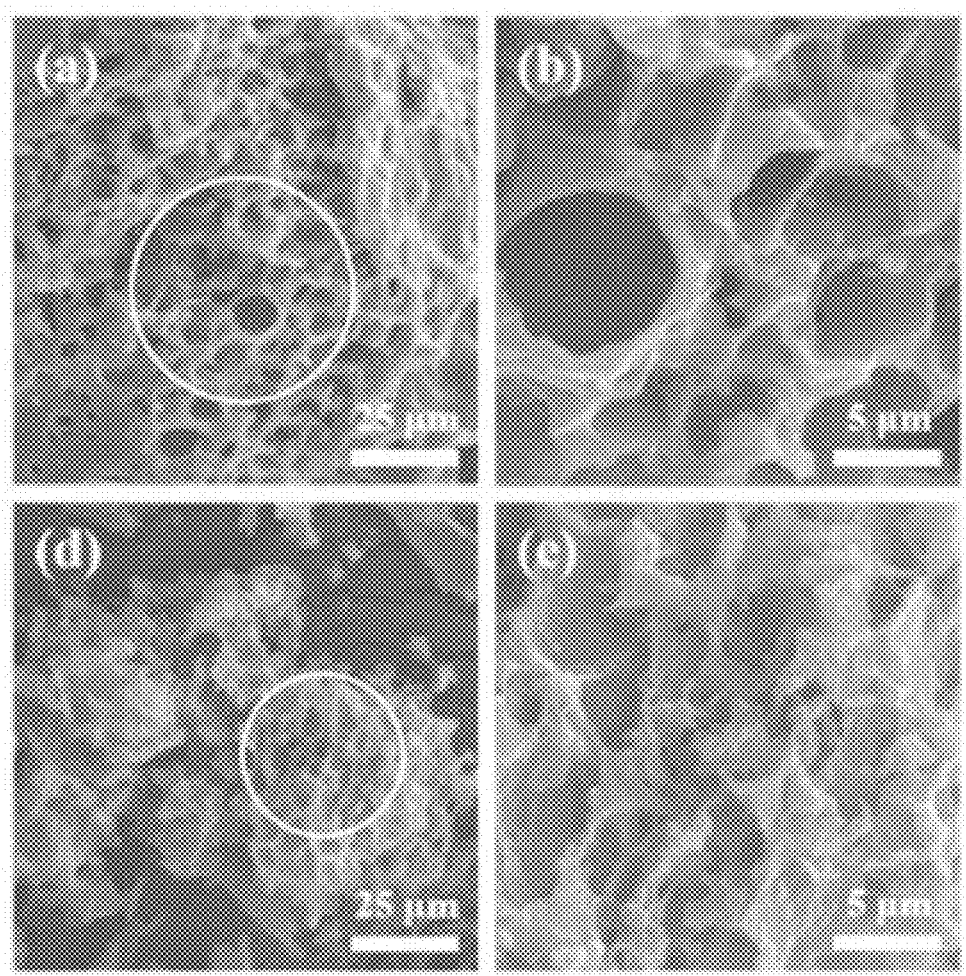
FIG. 3 is images of hierarchical porous carbon developed from tea roasted to 600° C., and in which the images indicate porosity.

FIG. 3 indicates that tea also exhibits these same or similar properties. Tea may be heated for developing what is called a hierarchical porous carbon as imaged in FIG. 3.

FIG. 3 gives images of hierarchical porous carbon developed from tea roasted to 600° C. The images show porosity. The four images are labeled as (a), (b), (d), and (e), respectively. The images (a) and (d) have a scale bar of 25 µm. The image (b) is generally from within the circle of image (a) and magnified having a scale bar of 5 µm. The image (e) is generally from within the circle of image (d) and has a scale bar of 5 µm. As depicted, a similarity may be noted between the tea (FIG. 3) and the kerogen (FIG. 1).

Figure 4:
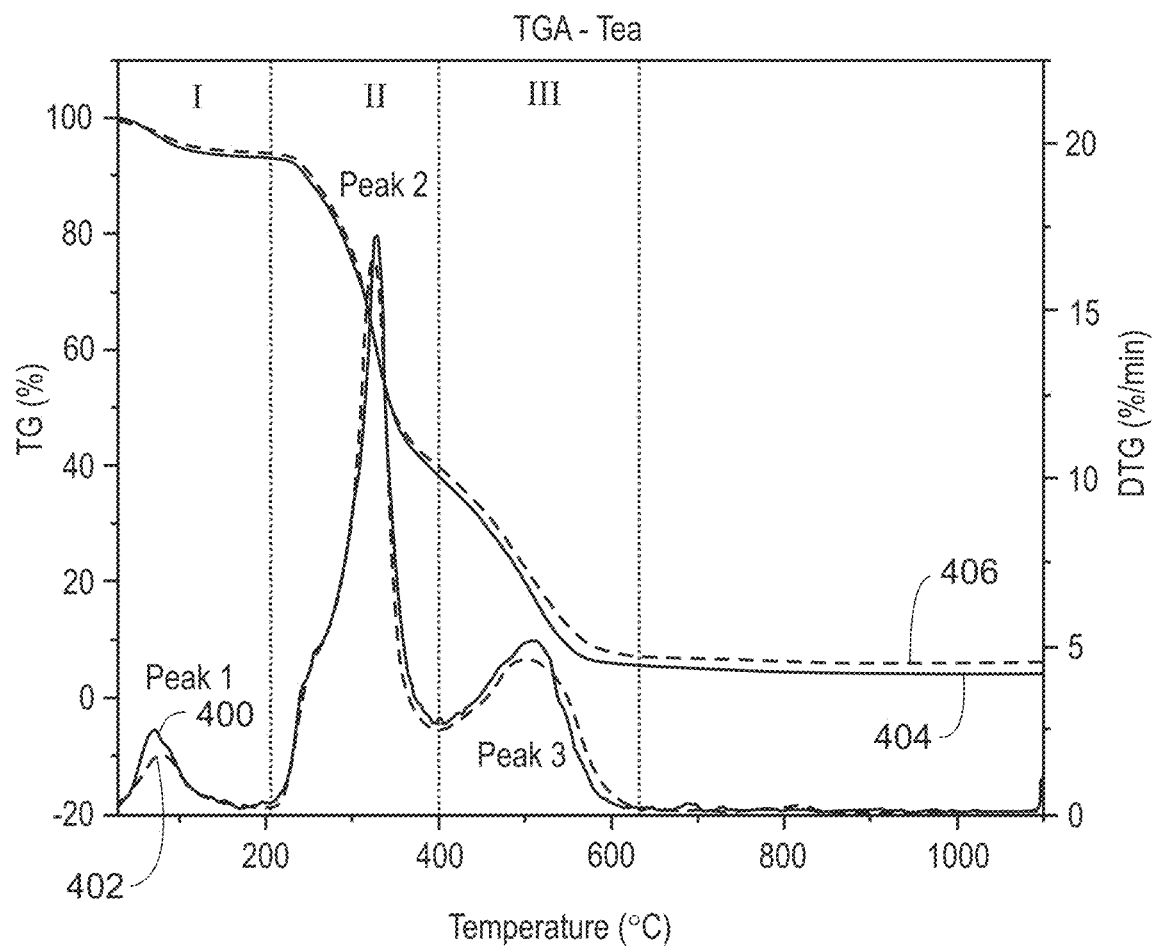
FIG. 4 is a plot of TGA for waste tea (WT), and indicates weight loss of the WT over temperature.

FIG. 4 is a plot of TGA for waste tea (WT), and indicates weight loss of the WT over temperature. Waste tea may refer to tea leaves that have been boiled or steeped. The term "tea" as used herein in shorthand may refer to waste tea. Tea and waste tea may be equivalent in the context of implementations herein. The plot is over temperature (° C.) of both thermogravimetry (TG) in percent (%) of weight and derivative thermogravimetry (DTG) in percent per minute (%/min). DTG is the first derivative of TG. The curves 400 and 402 are for TG, and are similar. The curves 404 and 406 are for DTG, and are similar. The solid curves 400 and 404 are for WT in nitrogen ($N_2$) and oxygen (O2). The dashed curves 402 and 406 are for WT in carbon dioxide ($CO_2$) and O2. The second peak for the DTG curve 404 is 17.02%/min at 328.6° C. The second peak for the DTG curve 406 is 16.76%/min at 326.3° C. The third peak for the DTG curve 404 is 5.18%/min at 508.2° C. The third peak for the DTG curve 406 is 4.65%/min at 508.3° C.

The Roman numerals I, II and III are used to distinguish source rocks according to kerogen type. Type I is kerogen composed mainly of liptinite macerals from marine or lacustrian algal organic matter. Type II consists of kerogen with organic matter composed mainly of Liptinite macerals originating from both marine, algal and bacterial sources. Type III consists of vitrinite macerals from organic matter derived from cellulose and lignin from terrestrial plants such as that found in coals. Type I kerogen typically produces predominately oil. Type II kerogen produces predominately oil and gas. Type III kerogen typically generates gas.

This TGA plot of FIG. 4 for tea can be compared to the TGA plot of FIG. 2 for kerogen. The TGA plots of FIGS. 2 and 4 show the weight loss that accompanies increasing temperature. This trend shows the loss of volume due to volatility of the labile fraction of both polymers (tea and kerogen), which creates porosity. Consequently, utilizing tea as a proxy for kerogen, prepared over variable temperature ranges, can create a desired porous structure comparable to that developed in kerogen during maturity.

Figure 5:
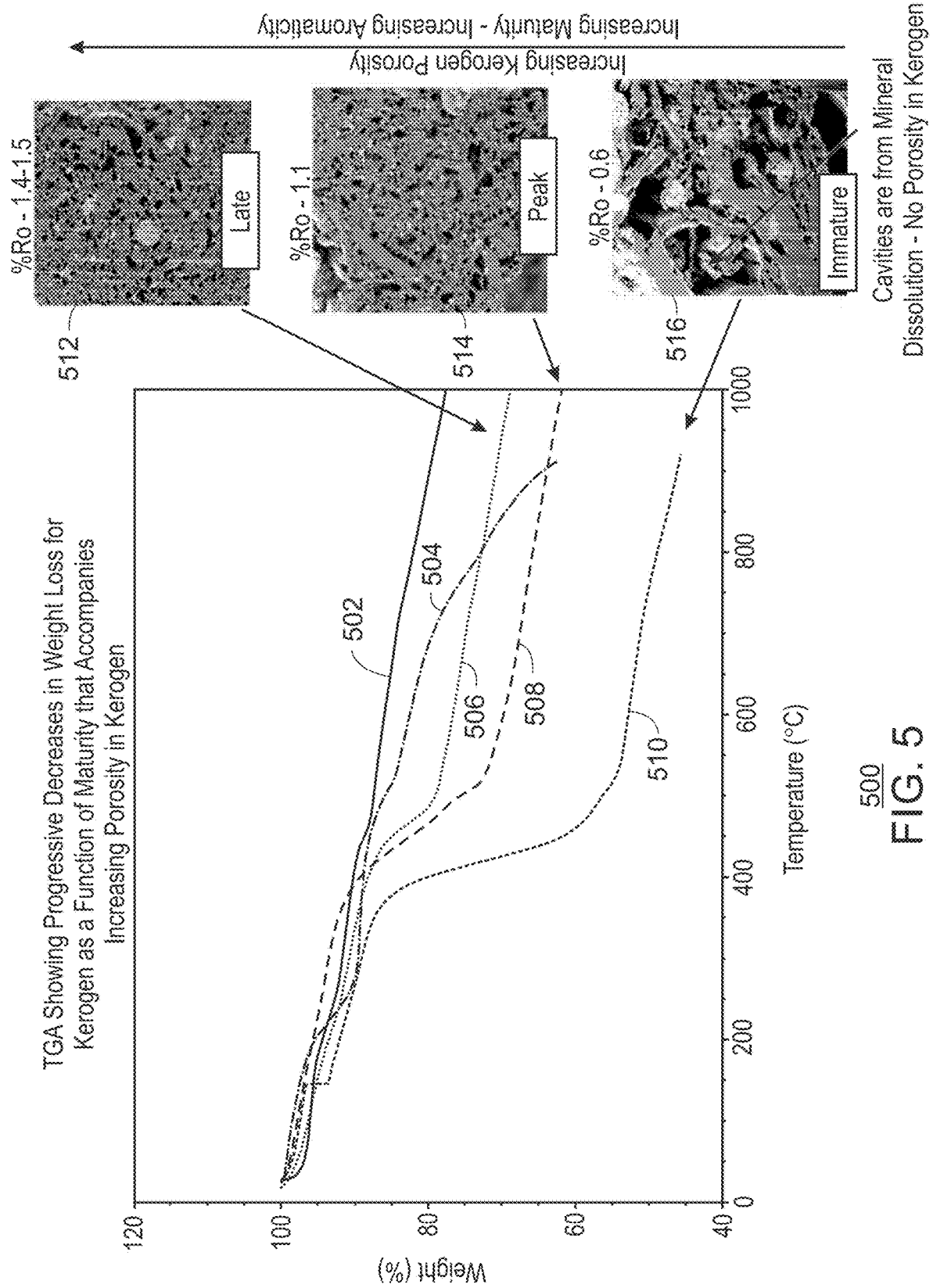
FIG. 5 is a TGA plot 500 of % of weight over temperature for five kerogen samples.

FIG. 5 is a TGA plot of % of weight over temperature (° C.). FIG. 5 is a plot of a TGA analysis showing the loss of weight relative to a change in temperature during analysis of kerogens of different maturity with different porosities. Five curves 502, 504, 506, 508, and 510 are plotted for five respective samples of kerogen. The TGA plot 500 indicates the relationship between increasing porosity in kerogen and the weight loss of each sample showing the decrease in volatility of the labile fraction of kerogen as kerogen matures and increases in aromaticity. The TGA showed progressive decreases in weight loss for kerogen as a function of maturity that accompanies increasing porosity in kerogen.

Images 512, 514, and 516 of three of the samples are given for curves 506, 508, and 510, respectively. The images 512, 514, and 516 are scanning electron microscope (SEM) images (photos). The images 512, 514, and 516 are of the three respective samples as isolated kerogen samples. The image 512 is for a sample of kerogen with late maturity and having % Ro of 1.4-1.5. The image 514 is for a sample of kerogen with peak maturity and having % Ro of 1.1. The image 516 is for a sample of immature kerogen having % Ro of 0.6. In the sample of image 516, the cavities are from mineral dissolution, and with no porosity in kerogen. Again, increasing kerogen porosity may be realized with increasing maturity and associated increasing aromaticity.

The estimates (late, peak, and immature) of the stage of maturity are accurate according to that defined for given % Ro and hydrogen:carbon atomic ratio (H/C ratio). The % Ro is a symbol and acronym used to denote the average percent reflectance measured from visible light reflected upon vitrinite macerals immersed in oil in polished source rocks. In the absence of this measurement, a proxy has been developed as an equivalent % Ro wherein a maximum temperature derived from the pyrolysis of the powdered rock sample is used to compute an equivalent % Ro. The % Ro presented in FIG. 5 is an equivalent value computed from this proxy.

The TGA of 510 is the weight loss of hydrocarbon volatiles recorded for an immature kerogen heated from 30° C. to 925° C. An SEM photo of the kerogen analyzed is seen in 516 along with some estimate of its maturity from % Ro value of 0.6. The TGA of 508 represents the weight loss of hydrocarbon volatiles from kerogen in the peak oil maturity window from 30° C. to 1000° C. An SEM photo of the kerogen analyzed is seen in 514 along with an estimate of the maturity from the % Ro value of 1.1. The TGA of 506 represents the weight loss of volatile hydrocarbons from kerogen in the Late Maturity window from 30° C. to 1000° C. An SEM photo of the kerogen is seen in 512 along with estimate of the maturity from the % Ro value of 1.4-1.5. The TGA of 502 is the weight loss of volatile hydrocarbons from kerogen in the gas maturity window from 30° C. to 1000° C. There is no SEM photo of this kerogen. Finally, the TGA of 504 is the weight loss of remaining volatiles in an over mature kerogen along with thermal decomposition of secondary minerals hydroxyl-based minerals that have formed during the rock digestion process for recovering the kerogen. As a result, it is not generally a diagnostic trend because of the interference posed by the mineral. Overall, the weight loss as function of temperature for the samples analyzed decreases with increasing maturity meaning that as kerogen increases in maturity as defined by the % Ro the volatile hydrocarbons generated from the kerogen also decreases which is to be expected.

A van Krevelen diagram is a graphical plot developed by Dirk Willem van Krevelen to assess the origin and maturity of kerogen and petroleum. The diagram cross-plots the hydrogen:carbon (H/C) atomic ratio as a function of the oxygen:carbon (O/C) atomic ratio. Kerogens with different potentials to produce oil during maturation can generally be distinguished on a van Krevelen diagram. The compositional change in both kerogen and tea can be estimated utilizing the van Krevelen diagram.

Figure 6:
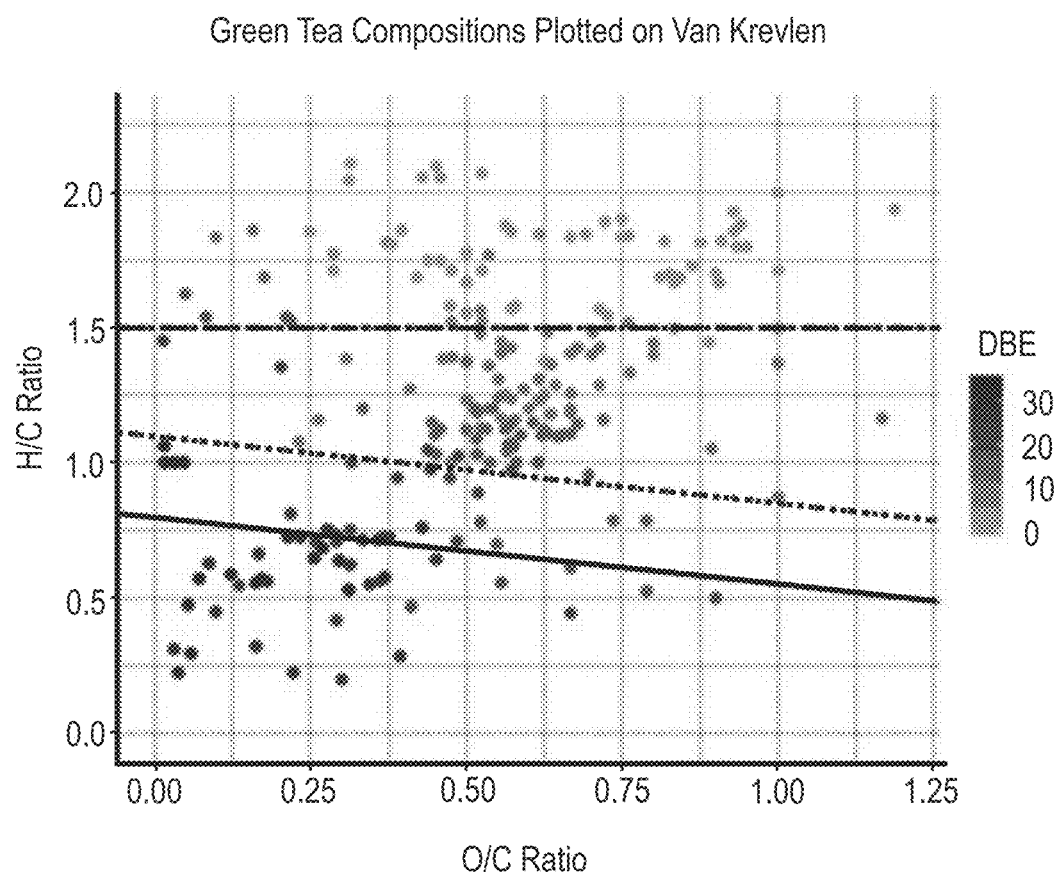
FIG. 6 is a van Krevelen diagram for green tea compositions as plotted.

FIG. 6 is a van Krevelen diagram for green tea compositions as plotted. The term "tea" as used herein may refer to green tea. Tea and green tea may be equivalent in the context of implementations herein. The shading of the plotted values is referenced by the shading scale for the double bond equivalent (DBE). DBE may represent the number of molecules of hydrogen ($H_2$) that would be added to convert all "pi" bonds to single bonds and all ring structures to acyclic structures. DBE may the value to denote differences in structure of the organic molecule. Ring structures and double bonded alkenes composing kerogen are similar to that found in tea.

The van Krevelen diagram is the elemental atomic ratio of hydrogen to carbon (H/C ratio) versus the elemental atomic ratio of oxygen to carbon (O/C ratio). The dashed line (at 1.5), the dotted line, and the solid line are distinguishing differences in composition related to the H/C and O/C ratio of the organic structure of the tea. The change in composition of tea is analogous to the H/C and O/C changes kerogen plotted on the van Krevlen diagram. The compositional change in tea can be estimated utilizing the H/C vs. O/C from van Krevelen, similar or the same as a van Krevelen diagram utilized for kerogen to determine compositional maturity.

Figure 7:
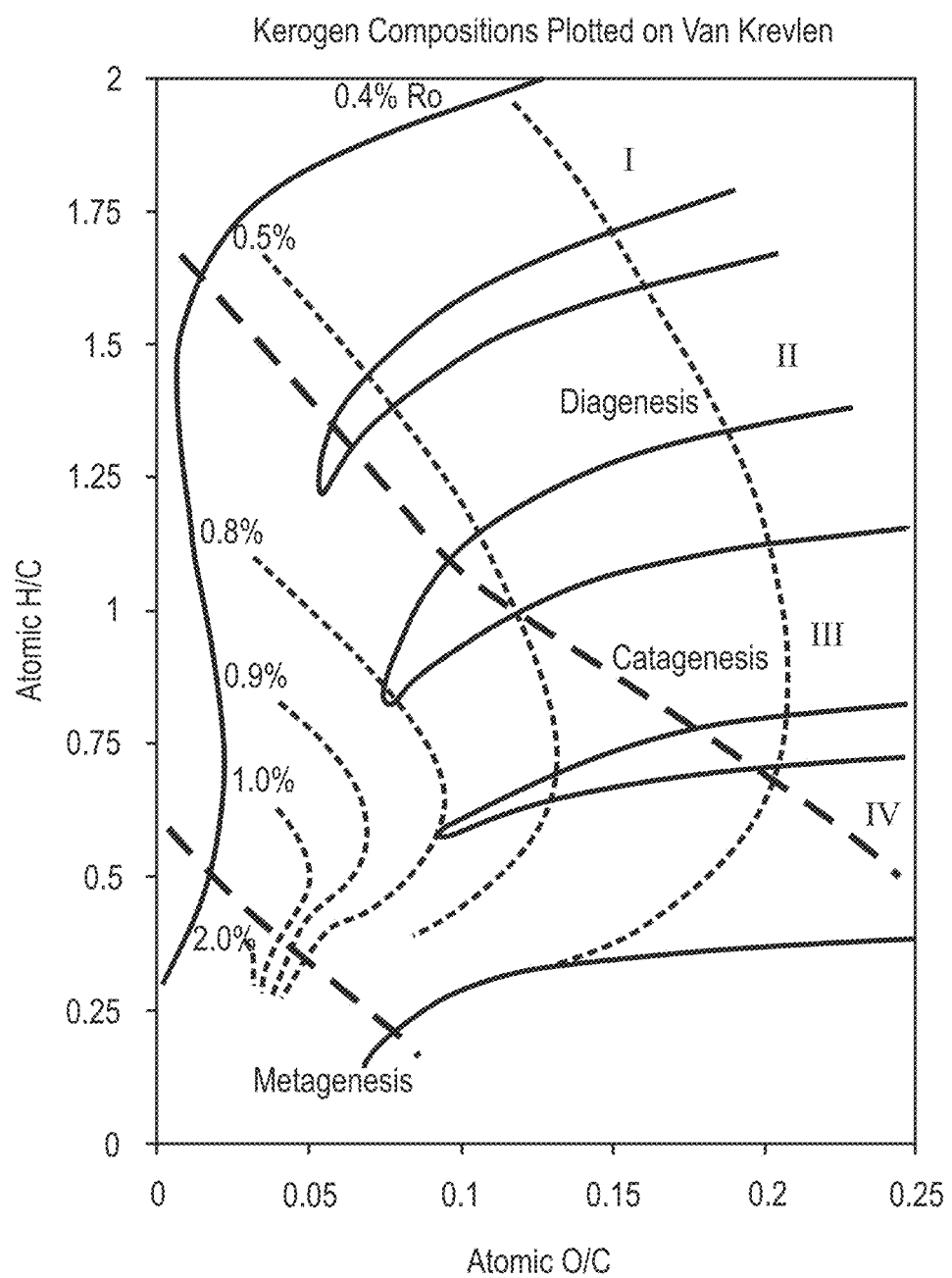
FIG. 7 is a van Krevelen diagram for kerogen compositions as plotted.

FIG. 7 is a van Krevelen diagram for kerogen compositions as plotted. Type I represents kerogen of marine or lacustrian origin containing mainly algal remnants called liptinites. Type II represents kerogen of marine origin containing predominately algal and bacterial remnants called liptinites. Type III represent kerogen of terrestrial origin containing remnant cellulose and lignin fragments of land plants as macerals called vitrinite. Type IV kerogen is composed of remnant charred and bacterially decomposed organic matter as macerals called inertinite. Each kerogen type is defined and categorized according to the H/C and O/C ratio composition of these macerals.

Again, a van Krevelen diagram is the elemental atomic ratio of hydrogen to carbon (atomic H/C) versus the elemental atomic ratio of oxygen to carbon (atomic O/C). The solid curves correspond to the regions defined by the H/C and O/C ratio of each kerogen type. The small-dashed lines represent the expected % Ro for the given H/C and O/C ratio of kerogen from immature defined by % Ro of 0.4-0.5 down to % Ro of 2.0 within the gas window. The two large-dashed lines separate known compositional boundaries defined by the H/C and O/C ratio of the three stages of transformation of organic matter into hydrocarbons. As mentioned, this van Krevelen analysis for kerogen can be similarly applied to tea.

Figure 8C:
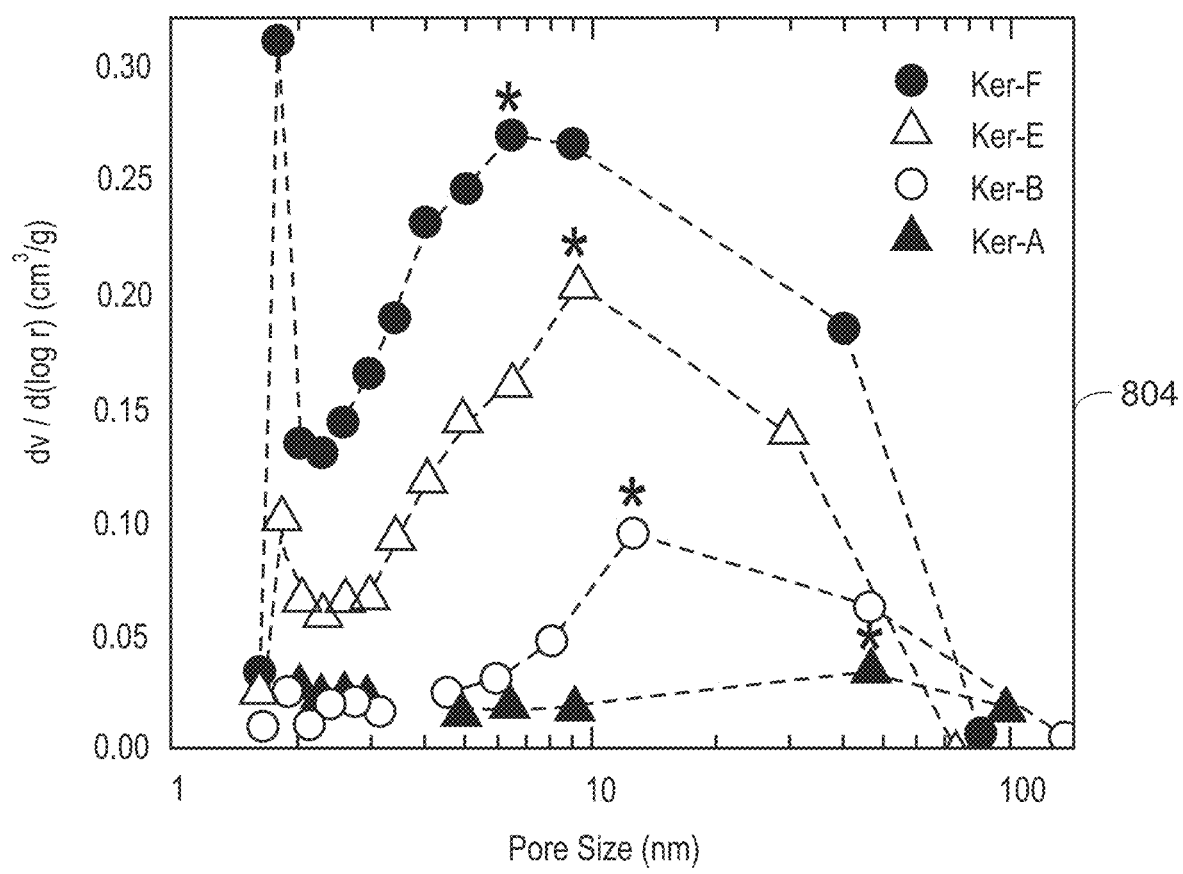
FIG. 8C is a plot indicating that that porosity can be measured using BET nitrogen adsorption.

FIGS. 8A, 8B, and 8C are table 800, table 802, and plot 804, respectively, all indicating that that porosity can also be measured using Brunauer, Emmet, and Teller (BET) nitrogen adsorption. Surface area, porosity, and pore diameter may be measured via BET for both tea and kerogen.

FIG. 8A (table 800) is for BET nitrogen adsorption of hierarchal carbon from tea. Table 800 is for three samples of tea, which are crushed TW, TW-Car, and HCl-TW-Car. Crushed TW is crushed tea waste (TW). Tea waste (TW) may also be known as waste tea (WT). The crushed TW is formed by washing, drying, and crushing TW, and removing particles greater than 250 μm (via a 250 μm sieve) from the crushed TW to give the particles that pass through the sieve as the final crushed TW. The drying is performed overnight in a vacuum oven at 80° C. Tw-Car is the crushed TW subjected to carbonization at 600° C. for 1 hour under Argon (Ar). HCl-TW-Car is crushed TW that subjected to acid treatment via 1 molar (M) hydrochloric acid (HCl) at 120° C. for 2 hours, and the acid-treated crushed TW is subjected to carbonization at 600° C. for 1 hour under Ar. For each sample, table 800 gives BET surface area in square meters per gram (m2/g) and total pore volume in cubic centimeters per gram (cm3/g) with $p/p_0=0.988$, where p is initial fraction pressure and $p_0$ is final fractional pressure. Table 800 also gives average pore diameter in nanometers (nm). The BET method is a common method to measure the surface area of samples. The BET method utilizes the isothermal adsorption and desorption of nitrogen as a function of fractional pressure from 0 to 1.0 the initial $p_0$ to the final p. The total adsorbed gravimetrically is in cm3/g (or cc/g) of the sample.

FIG. 8B (table 802) is for BET nitrogen adsorption of kerogen for four samples of kerogen. For each sample, table 802 gives $f_{Ar}^{Ker}$ which is fraction of aromaticity. For each sample, table 802 also gives surface area (m2/g) and pore volume in cubic centimeters per gram (cc/g). The four kerogen were collected in a range of maturities from the Eagle Ford shale that were used to determine the chemical structure via solid-state nuclear magnetic resonance. Thus, the table 802 includes surface area and pore volume determined by BET similar to that reported in table 800 for tea leaves. Also included is an estimate of the corresponding fraction of aromaticity ($f_{Ar}^{Ker}$) present in the kerogen organic structure as determined by solid-state nuclear magnetic resonance, which is also a measure of the maturity. As can be seen, as the aromaticity increases so too does the porosity.

FIG. 8C (plot 804) is for the four samples of table 802, as noted by the legend in the upper right portion of plot 804. The legend indicates the symbol for the respective data points. Dashed lines are drawn between the data points for a given sample. Peaks for each of the four samples are noted with a star. Plot 804 is a plot of the derivative dV/d(log r) versus pore size (nm). The derivative dV/d(log r) is in $cm^3$/g. The term "V" represents the volume of gas adsorbed per gram of kerogen and in this case dV refers to the change in that volume. The term "r" refers to the pore radius determined by the surface area measurement and in the case d(log r) a change in the base 10 logarithm of the pore radius Together the ratio represents the BJH (Barret, Joyner, and Halinda) method for determining pore size distribution per input from the BET results.

Figure 9:
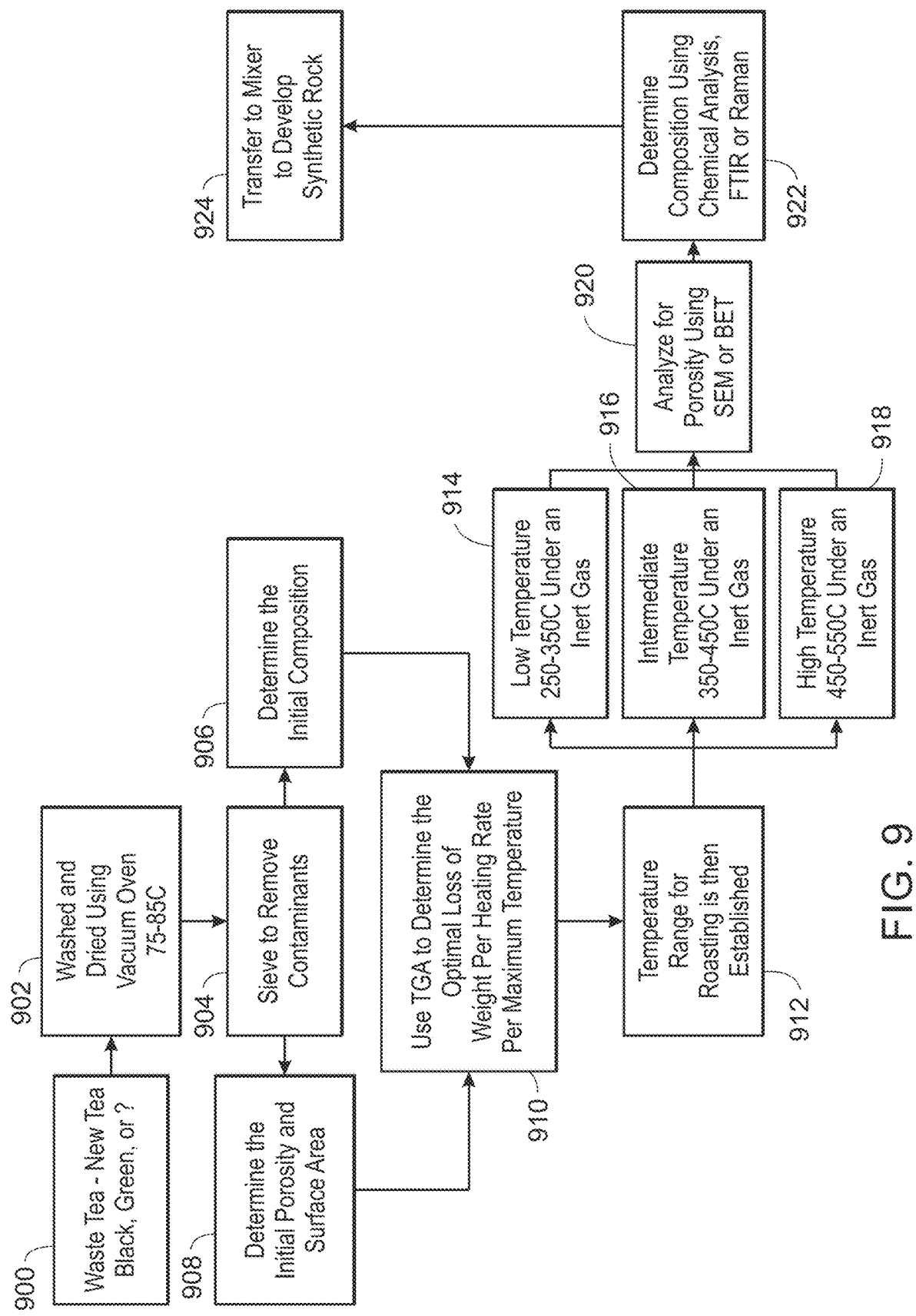
FIG. 9 is a block flow diagram of a procedure to create synthetic kerogen from tea leaves.

FIG. 9 is an example of a procedure to form synthetic kerogen from tea leaves. The block flow diagram shows actions towards developing a hierarchical carbon structure from tea in which properties are comparable to properties of kerogen during different stages of maturity. The temperatures ranges depicted in FIG. 9 are given only as examples and do not limit the present techniques. Similar procedures to generate synthetic kerogen from tea leaves may employ analogous temperature variables having values outside of the numerical ranges given in FIG. 9.

At block 900, the type of tea may be selected. Waste tea (of generally any type) may be desired because in waste tea, most of the fluids and liquid in tea have been distilled or diffused from the leaves during boiling or steeping. Green tea may be advantageously applicable when highly ordered pores are desired. Tea of generally any type may be applicable. Applicable are white tea, yellow tea, green tea, oolong, dark tea, and black tea, which are all generally harvested from one or the other, but are processed differently to attain varying levels of oxidation. Twig tea (twigs and stems of the *Camellia sinensis* plant) may be utilized. In general, the source of origin of the tea may be tea leaves from a tea plant or *Camellia sinensis* plant. The tea leaves may be ground into fine powder.

At block 902, the tea (e.g., tea leaves) may be washed and dried to promote that little or no remaining fluids are present. The tea may be dried, for example, under a vacuum in an oven for at least 12 hours (e.g., in a range of 12 hours to 24 hours) at a temperature in a range of 70° C. to 85° C. or in a range of 70° C. to 100° C. The tea may be weighed until the weight does not change or significantly change. For multiple drying cycles, the tea may be weighed after each drying cycle. Dryness may be verified by measuring the tea with a calibrated balance. After drying, the tea leaves may be ground to a powder utilizing, for example, a ball mill. The particle size of this powder (tea as ground) may be, for example, in range of 25 µm to 500 µm. This powder may be labeled as tea powder, ground tea powder, milled tea powder, etc., and may be referred to as tea.

At block 904, the tea (tea powder) may be passed through a sieve (e.g., 250 µm particle sieve) to remove any potential contaminants (e.g., particles having a particle size greater than 250 µm) from the dried tea. In some instances, such larger particles (>250 µm) could pose problems with the synthetic rock chemistry. The recovered grains (e.g., particles less 250 µm in particle size or diameter) that pass through the sieve may be comparable to those of kerogen recovered in rock.

At blocks 906, the initial composition of the tea (sieved dried tea) may be determined. For instance, the sieved samples may be analyzed for chemistry utilizing elemental analysis. Elemental analysis may be performed, for example, utilizing combustion and in which the corresponding gas generated is analyzed via detectors attuned to detect elements, such as hydrogen (H), carbon (C), oxygen (O), nitrogen (N), and sulfur (S). Elemental analysis may be conducted, for example, to determine H/C and O/C ratios for present-day composition (initial composition) and classification, and to determine initial composition. The classification may be classification analogous to kerogen maturity. The classification may be primarily according to kerogen type, at least initially. Then, the change in H/C and O/C ratio relative to the initial H/C ratio can be relied on to define maturity.

At block 908, the surface area and porosity of the sieved samples may be determined, for example, either by nitrogen adsorption from BET or water adsorption. The values for surface area and porosity may be relied on to determine the initial pore structure, which is utilized when evaluating the analyses from the thermogravimetric analyzer. Observations and values for initial pore structure may be utilized in evaluating the TGA. The corresponding pore structure may be dependent upon maturity or the loss of H/C that is determined from the initial composition. From that initial composition as the sample is heated with the TGA, a decrease in H/C will generally occur that will correspond to a loss of volume as detected by the loss of weight with increasing temperature. The loss in volume can manifest as porosity in the sample. Thus, understanding the progression of porosity development with increasing temperature during heating can allow for predicting the porosity that occurs.

The values and observations for initial composition, initial porosity, initial surface area, and initial pore structure may be beneficial for determining the roasting temperature to give roasted tea with a desired porosity, surface area, and kerogen maturity equivalent. In other words, the initial porosity (and surface area) can lead to know how much porosity increase (weight/volume loss) is targeted (and thus to specify a roasting temperature) to give the desired maturity/porosity of the roasted tea. This can be what is intended with respect to the TGA in which TGA may be utilized to determine a temperature needed to produce desired porosity. The comparison of the tea to kerogen maturity may correlative with (based on) the final composition of the roasted tea. The comparison of kerogens composition with respect to different maturities may be utilized to determine an analogous maturity for tea.

At block 910, the sieved dried tea may be subjected to TGA. The TGA may determine beneficial or optimal loss of weight per heating rate per temperature (e.g., maximum temperature). Sample lots may be taken from the prepared materials and a thermal gravimetric analyzer utilized to determine the maximum weight loss per heating rate per maximum temperature threshold. This may be utilized to determine the heating rate and temperature to produce surface areas and porosities comparable to less mature kerogens. This TGA-determined maximum weight loss per heating rate per maximum temperature threshold may also be relied on to determine weight loss and surface area increases in the tea due to roasting under higher temperature comparable to more mature kerogens as well. The TGA may facilitate determining roasting temperatures for the tea to acquire the surface area and porosity (and thus the kerogen-analogous maturity) desired of the roasted tea.

At block 912, this TGA-generated information from block 910 (and additional information) may provide for constraints for deciding parameters (and parameter values) utilized to roast the remainder of the batch for use as synthetic kerogen of different surface areas and chemical structures. Temperature range(s) for roasting the sieved dried tea may be established. TGA typically allows one to explore the rate of thermal decomposition of a given compound and generally employs less than 100 mg of sample. The technique can be accurate for determining the temperatures beneficial to roast tea, and to acquire the surface area and porosity desired. In addition to temperature, the roasting time (duration) may be considered. The duration may be a variable. The temperature rate change can be a variable and so can the time spent at any one temperature.

It should be noted that TGA analysis of both tea and natural kerogen may show that the loss of weight from each occurs, for example, with at least three stages of similar temperatures. In some instances, (1) the first stage occurs in the temperature range of 95° C. to 110° C. due to the loss of moisture, (2) the second stage occurs in the temperature range of 200° C. to 350° C. due to loss of organic volatiles, and (3) finally the third stage is in the temperature range of 400° C. to 600° C. due to carbonization resulting in aromatic condensation reactions typical in very mature kerogen. Therefore, the TGA may suggest that the temperature range for synthesizing a chemical and porous structure from tea similar to kerogen occurs between 400° C. and 600° C. Beyond 600° C., carbon layers may form due to increasing aromaticity which will began to form graphene. Therefore, the roasting of the tea in the oven may be maintained between 400° C. and 600° C. depending upon the maturity desired. For "maturity desired," the tea may not have an actual maturity but instead this is a state ("artificial maturity") of the tea that corresponds to a kerogen maturity desired. With respect to kerogen, maturity indicates (and provides a measure of) the transformation of kerogen into hydrocarbons, and a decrease in H/C accompanies increase in kerogen maturity. The tea transformation with increasing temperature will also change in H/C and O/C ratio which is analogous or comparable to what happened to kerogen. In implementations, determining if analogous maturity is reached may evaluated by the change in the H/C and O/C ratio and corresponding measured surface area compared to the initial composition and starting surface area of the tea.

At blocks 914-918, examples for roasting temperature (temperature ranges) may be established or specified. The temperatures may be specified for roasting of the sieved dry tea under an inert gas. At block 914, for a low temperature roast, the roasting temperature range specified is 250° C. to 350° C. At block 916, for an intermediate temperature roast, the roasting temperature range specified is 350° C. to 450° C. At block 918, for a high temperature roast, the roasting temperature range specified is 450° C. to 550° C.

An option is to chemically treat the tea with an activating agent. This activation may be performed, for example, before the TGA (and thus before roasting). In the event that the workflow does not produce the desired porosity and composition of the tea, chemical treatment may be beneficial to activate the process. This action (activation via chemical treatment of the tea) would generally be implemented after crush and sieving and prior to TGA analysis and subsequent roasting as well. As for the chemical treatment for activation, the tea may be chemically treated with an activating agent, such as phosphoric acid ($H_3PO_4$), HCl, sulfuric acid ($H_2SO_4$), potassium hydroxide (KOH), or sodium hydroxide (NaOH). Again, activation will typically be before both TGA analysis and roasting. Temperature, concentration, and activation time may be tailored to achieve beneficial or optimal oxygen content and surface area for kerogen proxy. The tea may be activated, for example, at temperatures ranging from 60° C. to 120° C., with activating agent (acid or base) to tea weight ratio of 1:1 to 3:1 for 2-12 hours. In one example, $H_3PO_4$ or NaOH as the activating agent at a concentration of 2 molar (M) in two respective tests was added to the tea at a weight ratio of 3:1 acid/base to tea at 60° C. for 2 hours. The slurries were dried at 110° C. for 24 hours. The resulting mixture was then ground to a powder and used for carbonization. After carbonization, the samples were cooled and rinsed with deionized water until the pH was neutral. The resulting surface area was high relative to typical kerogen, so the methodology can be beneficial or optimized for synthetic kerogen applications. In a second example, KOH was added to tea leaves in a weight ratio of 2:1 in 100 milliliters (mL) water and stirred in a hot water bath at 75° C. for 4 hours prior to carbonization. Post-carbonization, the sample was cooled and ground, and treated with HCl for 12 hours, rinsed with water until neutral, and dried. The resulting surface area was also high relative to typical kerogen, so the methodology can be advantageous or optimized for synthetic kerogen applications. In another example, activation was achieved by treating the tea leaves with HCl (1 M concentration) at 120° C. for 2 hours.

Batches of the sieved dried tea may be roasted, such as at a roasting temperature in one of the temperature ranges given in blocks 914, 916, or 918. The roasting may be conducted under an inert atmosphere. The inert gas for the inert atmosphere may be maintained by a positive pressure, for example, in the range of 80 pounds per square inch gauge (psig) to 100 psig. The inert gas may be, for example, nitrogen or argon. The inert atmosphere may promote that the sample is not roasted under an oxidizing environment. The vessel for roasting the tea may be, for example, a Parr reactor available from Parr Instrument Company having headquarters in Moline, Ill., USA. The vessel or reactor to receive the sieved dry tea for roasting may be a pressure vessel that acts as an oven and can be an autoclave reactor, a stirred vessel or reactor, a non-stirred vessel or reactor, and the like. In the example of a Parr reactor (or similar reactor), the reactor vessel may act as an oven. The Parr reactor is a steel Inconel vessel that can heat a sample to a set temperature when placed in a temperature controlled heated steel sleeve. The Parr reactor (e.g., an autoclave) can monitor both the temperature and pressure of the vessel during the reaction.

The roasting pressure should generally be adequate to promote that little or no oxygen is present and that roasting occurs under a reducing environment. Oxygen can be very corrosive at higher temperatures and can react with other volatile compounds during roasting that could produce chemical changes in the tea that would affect the carbonization process. Several purges of the oven system (reactor vessel system) with the inert gas at higher pressures may be carried out prior to increasing temperatures in the oven (vessel) to facilitate removal of oxygen in the vessel.

At block 920, after each batch of sieved dried tea is roasted, the roasted tea may be analyzed for porosity utilizing, for example, SEM imaging or BET. The sample porosity (including the porosity that developed due to the roasting) may be measured by BET. The sample porosity may also be determined using SEM imaging and segmentation processing to consider the volumetrics (relating to or involving the measurement of volume) to measure the pore spaces. Water isotherms from relative humidity adsorption can also be employed to produce an estimate of the porosity.

At block 922, the composition of the roasted tea may be determined via, for example, chemical analysis, Fourier-transform infrared (FTIR) spectroscopy, or Raman spectroscopy. This final composition of the roasted tea may be analyzed, such as for H/C atomic ratio or O/C atomic ratio, to determine the state of the roasted tea (in regard to the analogous potential maturity of kerogen) to compare to the initial composition and surface area measured prior to roasting. Kerogen maturity may be determined or correlated with the kerogen H/C atomic ratio or with the combination of the kerogen H/C atomic ratio and kerogen O/C atomic ratio. Maturity, prior to vitrinite reflectance was determined by elemental composition. The van Krevlen diagram and the trend recorded for each type of organic matter shows that as kerogen matures by the loss of H/C so too does O/C decrease. The FTIR that is suggested has been shown to use vibrational energies of the chemical moieties of kerogen, mainly those corresponding to $CH_2$ and $CH_3$ to determine the H/C ratio as well. So too does Raman spectroscopy provide an estimate of the aromaticity changes in organic matter which is analogous to maturity in kerogen as it increases in aromaticity with increasing temperatures.

The porosity created in the tea during the roasting of the tea is generally comparable with that of known kerogen porosities measured per the maturity reached in source rocks through natural burial. Thus, a tea that is similar to an early mature kerogen may be between 5-10% porosity, peak maturity between 10-25% porosity, and late maturity between 25-40% porosity depending upon the lability of the tea. As mentioned, tea with implementations of the present techniques may have an artificial maturity corresponding to kerogen maturity for comparison and as a simulation. Tea similar to that of kerogen changes in composition as it thermally is decomposed similar to what happens as kerogen matures and produces hydrocarbons. Thus, a change in chemical composition in tea is analogous to a maturity change in kerogen.

At block 924, the roasted tea may be transferred to a mixer to formulate and develop synthetic rock. The roasted tea may be mixed with inorganic material (e.g., minerals) and compacted or formed into a synthetic rock sample. Minerals may be a solid inorganic substance of natural occurrence. Tea may serve as organic matter that is encapsulated through synthetic, chemical precipitation with silicate (quartz), aluminosilicate (clays and feldspars), calcite, etc. utilizing a reactor or autoclave.

In view of the foregoing, the final composition and porosity of the roasted tea can be relied on for both (1) developing and preparing static synthetic rock formulations of known organic composition and porosity and (2) evaluating in dynamic experiments how the porosity in tea evolves as the synthetic rock is artificially matured with increasing temperatures. Thus, the technique may analyze the chemical and mechanical changes the tea structure undergoes as the tea is subjected to higher temperatures comparable to analogous changes that occur during maturity of kerogen. The chemical changes may include, for example, decrease in hydrogen relative to carbon for H/C, decrease in oxygen relative to carbon for O/C, and decrease in sulfur relative to carbon that decreases the S/C. The mechanical changes may include, for example, Young's modulus and Poisson's ratio from elastic moduli.

The technique or procedure (method) can provide organic substrates that are similar or equal in chemical and mechanical properties to that in source rocks difficult to measure because of other surrounding mineral phases present. Thus, a better understanding can be gained about how certain components of the rock affect the mechanical properties because prior to mixing the components to synthesize the rock that information is known about each component. This is generally not the case for a natural source rock because organic matter can be either kerogen, bitumen, or pyrobitumen whose mechanical and chemical properties could vary. Another factor that could be impacted is that the porosity of the tea will be known a priori before synthesis and thus a theoretical porosity value can typically be computed based on the volumetrics of the rock as a prediction to compare with what is measured from the synthetic rock. In implementations, gas adsorption studies can be conducted to determine the Langmuir isotherms to predict how gas storage capacity is changing as a function of maturity, as well.

As for the aforementioned thermal analyses, thermogravimetric analysis or thermal gravimetric analysis (TGA) is a technique of thermal analysis in which the mass of a sample is measured over time as the temperature changes. The TGA may be conducted on an instrument referred to as a thermogravimetric analyzer. A thermogravimetric analyzer measures mass while the temperature of a sample is changed over time. Mass, temperature, and time may be base measurements of the TGA while many additional measures may be derived from these three base measurements. A thermogravimetric analyzer may have a precision balance with a sample pan located inside a furnace. The analyzer typically has programmable temperature control. The thermogravimetric data collected from a thermal reaction may be compiled, for example, into a plot of mass or percentage of initial mass on the y-axis versus either temperature or time on the x-axis. This plot, which may be smoothed, can be referred to as a TGA curve. The first derivative of the TGA curve can be labeled as the DTG curve. The DTG curve may be plotted to determine inflection points useful for in-depth interpretations as well as differential thermal analysis, and for additional reasons.

Figure 10:
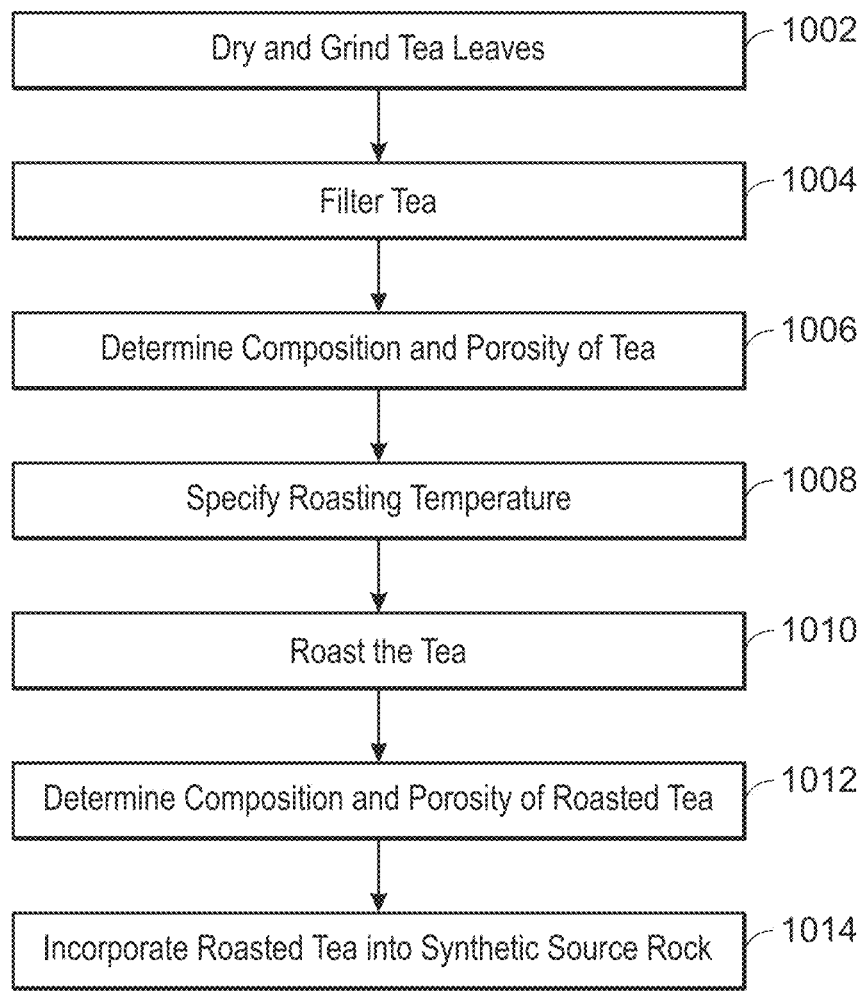
FIG. 10 is a block flow diagram of a method of preparing synthetic source rock having tea.

FIG. 10 is a method 1000 of preparing (and formulating) synthetic source rock having tea. The method can include preparing or processing tea for source rock analysis, and preparing tea for formulation in synthetic source rock. The tea may provide organic polymer similar to kerogen as a substitute for kerogen in source rock for the synthetic source rock. The roasting of the tea may give a hierarchical porous carbon similar to kerogen, and in which the roasting temperature of the tea may be varied to give roasted tea simulating (corresponding to or analogous to) different respective degrees or levels of kerogen maturity.

At block 1002, the method includes drying and grinding tea leaves. The tea leaves may be leaves of the tea plant (*Camellia sinensis* plant). The drying of the tea leaves may involve drying the tea leaves under a vacuum in an oven (e.g., industrial oven) for at least 12 hours (e.g., 12 hours to 18 hours, 12 hours to 24 hours, or 12 hours to 36 hours) at a temperature of at least 70° C., such as at a temperature in a range of 70° C. to 90° C. or in a range of 70° C. to 120° C. In certain implementations, the weight of the tea leaves may be monitored during drying to determine when loss of fluid or moisture from the tea leaves has substantially ceased so that the tea leaves may be labeled as dry. In implementations, the tea leaves may be dried before grinding the teal leaves. The grinding of the tea leaves may involve grinding or crushing the tea leaves with, for example, a grinder or a mill, such as a ball mill. The grinding of the dried tea leaves may give a ground tea or tea powder.

At block 1004, the method includes filtering the tea as ground or filtering the tea powder. For instance, the tea powder may be filtered (flowed or passed) through a separator or filter, such as fine mesh strainer, sift, sieve, woven screen (e.g., metal), etc., to remove large particles, such as particles having a particle size (e.g., width or diameter) greater than 250 μm sieve or 300 μm. For example, the filter may be a 250 μm sieve or 300 μm sieve.

At block 1006, the method includes determining chemical composition and porosity of the tea (tea powder). The composition of the tea may be determined (measured) via elemental analysis. The composition may be measured by chemical analysis or spectroscopy, such as FTIR spectroscopy, Raman spectroscopy, or energy-dispersive X-ray spectroscopy (EDS). This composition may be labeled as an initial composition. This composition may be labeled as present-day composition in regard to the analogy to kerogen maturity and kerogen composition. The H/C (atomic ratio) and the O/C (atomic ratio) may be determined based on the measured composition. The H/C and O/C of the initial composition may considered in the subsequent TGA and specifying of the roasting temperature. The porosity and surface area of the tea (tea powder) may be determined, for example, either by nitrogen adsorption from BET or water adsorption. The values for surface area and porosity may be relied on to determine the initial pore structure, which may utilized when evaluating the subsequent TGA.

At block 1008, the method includes specifying the roasting temperature for roasting the tea (tea powder). To specify the roasting temperature, the tea may be subjected to TGA. As discussed, the TGA may facilitate determining roasting temperatures for the tea to acquire the surface area and porosity desired of the roasted tea and thus give the kerogen-analogous maturity desired of the roasted tea. The roasting temperature as specified may correlative with the specified desired porosity of the roasted tea. Thus, the roasting temperature correlative with results of the TGA. Considered may be the initial composition (block 1006) and how the composition is to change in roasting to give desired H/C and O/C of the roasted tea. Thus, the roasting temperature as specified may be correlative with the initial composition and in view of the desired kerogen-analogous maturity (artificial maturity) of the roasted tea. The roasting temperature may be specified correlative with the initial composition and the porosity of the tea powder prior to roasting, and in view of the desired porosity of the roasted tea.

At block 1010, the method includes roasting the tea. The roasting of the tea subjects the tea to carbonization. The tea may be roasted by applying heat to the tea in an inert atmosphere, such as under an inert gas (e.g., nitrogen or argon). The tea powder may be roasted at the roasting temperature specified in block 1008. Example temperature ranges for the roasting temperature include 250° C. to 350° C., 350° C. to 450° C., and 450° C. to 550° C. To roast the tea, the tea powder may be placed in a vessel and heat applied to the tea powder in the vessel. The vessel may be an oven, reactor, autoclave reactor, a stirred vessel, a non-stirred vessel or reactor, and so on. The roasting can be continuous or semi-batch but generally is batch. The roasting system (e.g., oven or reactor) is typically a batch system. The roasted tea may be discharged from the vessel (e.g., oven or reactor).

At block 1012, the method includes determining the chemical composition and porosity of the roasted tea. The composition of the roasted tea may be determined (measured) via elemental analysis. The composition may be measured by chemical analysis or spectroscopy, such as FTIR spectroscopy, Raman spectroscopy, or energy-dispersive X-ray spectroscopy (EDS). This composition may be labeled as a final composition. This composition may be considered in regard to the analogy to kerogen maturity and kerogen composition. The H/C (atomic ratio) and the O/C (atomic ratio) may be determined based on the measured final composition. This final composition of the roasted tea may be analyzed, such as for H/C atomic ratio or O/C atomic ratio, to determine the state of the roasted tea (in regard to the analogous potential maturity of kerogen) to compare to the initial composition and surface area measured prior to roasting. Kerogen maturity may be determined or correlated with the H/C atomic ratio of kerogen or with the combination of the H/C atomic ratio and O/C atomic ratio. The porosity and surface area of the roasted tea may be determined, for example, either by nitrogen adsorption from BET or water adsorption. The values for surface area and porosity may be relied on to determine the pore structure. In implementations, the porosity of the roasted tea may be deduced by analogy to kerogen maturity (and associated kerogen porosity values) in view of the H/C atomic ratio (and O/C atomic ratio) of the roasted tea.

At block 1014, the method may include incorporating the roasted tea into synthetic rock. The roasted tea may be incorporated (e.g., mixed, encapsulated, formed into, etc.) with inorganic material (e.g., minerals) in a mixer, reactor, or autoclave. The inorganic source may be, for example, compositions of minerals typically composing rocks such as those of silicate, aluminosilicate, and carbonate mineralogies.

The mixture may be formed (e.g., compacted, pressed, molded, etc.) into synthetic source rock. The synthetic source rock may be a composite of the roasted tea and inorganic material. In the synthetic source rock, the roasted tea may be intertwined with the inorganic material. The synthetic source rock may be tested for the evaluation of a subterranean formation, such as an unconventional formation having kerogen. Tests performed on the synthetic source rock sample (a composite having both tea and inorganic material) may determine properties of the synthetic source rock sample. Tests may include, for example, tests measuring chemical composition from elemental analysis and x-ray diffraction, measuring surface area or porosity from BET, and measuring density and mechanical elastic moduli from nanoindentation or atomic force microscopy (AFM), and so forth.

An embodiment is a method of preparing synthetic source rock with tea. The method includes grinding tea leaves to give tea powder, roasting the tea powder at a roasting temperature to give a roasted tea powder, and determining composition (e.g., chemical composition) of the roasted tea powder via elemental analysis. The method may include specifying the roasting temperature correlative with the composition as specified. The determining of the composition may involve determining the composition of the roasted tea powder via elemental analysis. The method may include subjecting the tea powder to TGA. The method may include specifying the roasting temperature correlative with results of the TGA. The method may include specifying the roasting temperature correlative with the composition as desired and results of the TGA. The method includes determining porosity of the roasted tea powder. The method may include specifying the porosity and specifying the roasting temperature, thereby the roasting of the tea powder at the roasting temperature as specified gives the porosity as specified. The determining of the porosity may involve determining the porosity by SEM imaging or by BET nitrogen adsorption, or a combination thereof. The determining of the porosity may involve determining the porosity based on the composition and by analogy with kerogen maturity. The porosity in the tea leaves, tea powder, or roasted tea powder included into the synthetic rock may have a porosity similar that of kerogen for a given the maturity. Thus, the comparison of porosity according to maturity may be realized. The method may include mixing the roasted tea powder with inorganic material, thereby forming a synthetic source rock. The method may include mixing the roasted tea powder with inorganic material, thereby forming a synthetic source rock of known organic composition and known organic porosity. The method may include increasing the roasting temperature, thereby giving the synthetic source rock comprising a state corresponding to increased kerogen maturity.

Another embodiment is a method of preparing synthetic source rock having tea. The method includes drying and grinding tea leaves to give tea powder, determining composition and porosity of the tea powder, roasting the tea powder at a roasting temperature to give a roasted tea powder, and forming a synthetic source rock comprising the roasted tea powder. The method may include specifying the roasting temperature in response to a specified porosity of the roasted tea powder. The method may include specifying the roasting temperature correlative with the composition and the porosity. The method may include determining composition of the roasted tea powder via elemental analysis, and determining porosity of the roasted tea powder.

Yet another embodiment is a method of preparing synthetic source rock having tea. The method includes grinding tea leaves (e.g., leaves of a *Camellia sinensis* plant) to give tea powder. The method may include drying the tea leaves at a temperature of at least 70° C., such as at a temperature in a range of 70° C. to 110° C. or in a range from 70° C. to 130° C. Such drying may under a vacuum. The method may include drying the tea leaves under a vacuum in an oven for at least 12 hours (e.g., 12 hours to 36 hours) at a temperature of at least 70° C., such as the aforementioned ranges. The grinding of the tea leaves may involve grinding the tea leaves via a ball mill. The method may include filtering the tea powder via a sieve to remove particles from the tea powder. The particles remove may have a particle size greater than 300 μm or greater than 250 μm. The method includes determining chemical composition of the tea powder via elemental analysis, and determining porosity of the tea powder, specifying a roasting temperature via TGA of the tea powder, and roasting the tea powder at the roasting temperature as specified to give a roasted tea powder. The method may include specifying porosity of the roasted tea powder. The method may include realizing a specified porosity of the roasted tea powder via specifying the roasting temperature. The method may include determining composition of the roasted tea powder via elemental analysis, and determining porosity of the roasted tea powder correlative with the composition of the roasted tea powder. The method may include forming a synthetic source rock having the roasted tea powder and inorganic material.

Yet another embodiment is a synthetic source rock including roasted tea powder and inorganic material, such as a mineral or minerals. In geology and mineralogy, a mineral or mineral species may be a solid chemical compound with a defined chemical composition and a specific crystal structure that occurs naturally in pure form. The chemical composition of a named mineral species may vary somewhat by the inclusion of small amounts of impurities. Specific varieties of a species sometimes have conventional or official names of their own. Some mineral species can have variable proportions of two or more chemical elements that occupy equivalent positions in the mineral structure.

The roasted tea powder has a structure analogous to kerogen in a subterranean formation. The synthetic source rock is configured to be utilized to evaluate the subterranean formation (e.g., including to evaluate the kerogen in the subterranean formation and the impact of the kerogen on the subterranean formation). The synthetic source rock may correspond to actual source rock from the subterranean formation.

The inorganic material mixed with the roasted tea powder to form the synthetic source rock includes, for example, silicate, aluminosilicate ($Al_2O_5Si$), or carbonate, or any combinations thereof. Silicate includes silicon and elemental oxygen. While silicate may be an anion having silicon and oxygen, the silicate may be a silicate mineral(s). Silicate minerals may be rock-forming minerals made up of silicate groups. Silicate minerals are approximately 90 percent of the Earth crust. In mineralogy, silica (silicon dioxide) $SiO_2$ is usually considered a silicate mineral. Silica is found in nature as the mineral quartz, and its polymorphs. The aluminosilicate may be aluminosilicate minerals that are minerals composed of aluminium, silicon, and oxygen, plus countercations. Andalusite, kyanite, and sillimanite are naturally occurring aluminosilicate minerals that have the composition $Al_2SiO_5$. In chemistry, a carbonate is a salt of carbonic acid ($H_2CO_3$), characterized by the presence of the carbonate ion $CO_3^{2-}$. In geology and mineralogy, the term "carbonate" can refer both to carbonate minerals and carbonate rock (which is made of chiefly carbonate minerals), and both are dominated by the carbonate ion, $CO_3^{2-}$. Carbonate minerals are varied and ubiquitous in chemically precipitated sedimentary rock. The most common are calcite or calcium carbonate, $CaCO_3$, the chief constituent of limestone (as well as the main component of mollusc shells and coral skeletons); dolomite, a calcium-magnesium carbonate $CaMg(CO_3)_2$; and siderite, or iron(II) carbonate, $FeCO_3$, an important iron ore. Carbonate rocks are a class of sedimentary rocks composed primarily of carbonate minerals. The two major types are limestone, which is composed of calcite or aragonite (different crystal forms of $CaCO_3$), and dolomite rock (also known as dolostone), which is composed of mineral dolomite ($CaMg(CO_3)_2$). As appreciated by the skilled artisan, subterranean formations labeled as carbonate formations can have hydrocarbon. About half of the crude oil and natural gas reserves are held in carbonate reservoirs (fields). Carbonates can exhibit highly varying properties within small sections of the reservoir, making them difficult to characterize.

Lastly, in implementations, the roasted tea powder is tea leaves as ground and roasted. The tea leaves may be leaves of a *Camellia sinensis* plant.

EXAMPLE

This Example is given only as an example and not intended to limit the present techniques. This Example evaluated the hierarchical carbon technique for preparation of a synthetic source rock. Initially, 237 mL of water was added to an Erlenmeyer flask and set to boil at 100° C. on a hot plate. When the temperature reached 100° C., approximately 3144 milligrams of natural green tea was added to the water in the Erlenmeyer flask. Magnetic stirrers were added to the Erlenmeyer flask and the stirrers were set to rotate at 400 revolutions per minute (rpm). The tea was boiled in the water with the magnetic stirrers in the Erlenmeyer flask on the hot plate for 4 minutes. The Erlenmeyer flask was then removed from the hot plate, covered with a glass plate, and the tea in the water in the Erlenmeyer flask steeped for 1 hour. The steeped natural green tea labeled as waste tea (WT) was then filtered using a funnel and a sieve, and then washed thoroughly with distilled (DI) water. The WT was then dried in an oven at 100° C. for 24 hours to remove any remaining water. The dried WT was cooled to room temperature, ground, and sieved to obtain particles<250 μm in size.

This ground and sieved WT (particles<250 μm) was added to an Erlenmeyer flask with 1 molar (M) hydrochloric acid (HCl) and boiled at 120° C. for 2 hours on a hot plate as an acid treatment. Magnetic stirrers were added to the Erlenmeyer flask and the stirrers were set to rotate at 400 rpm for the 2 hours of boiling. After the 2 hours, the mixture of WT and HCl was filtered with a sieve to separate out the HCl, and the remaining HCl-treated WT was washed with DI water to ensure complete removal of HCl. The HCl-treated WT (HCl-WT) was then dried in an oven at 100° C. for 24 hours.

After cooling to room temperature, the HCl-WT was split into three batches and subjected to carbonization. To prepare for the carbonization, each representative fraction (batch) was placed in a quartz boat and inserted in the center of a 47" quartz tube. For the carbonization, the tube was introduced into a high temperature tube furnace and roasted for 1 hour under Argon (Ar) at 1) 200° C., 2) 400° C., and 3) 600° C., respectively, for the three batches (samples).

Figure 11:
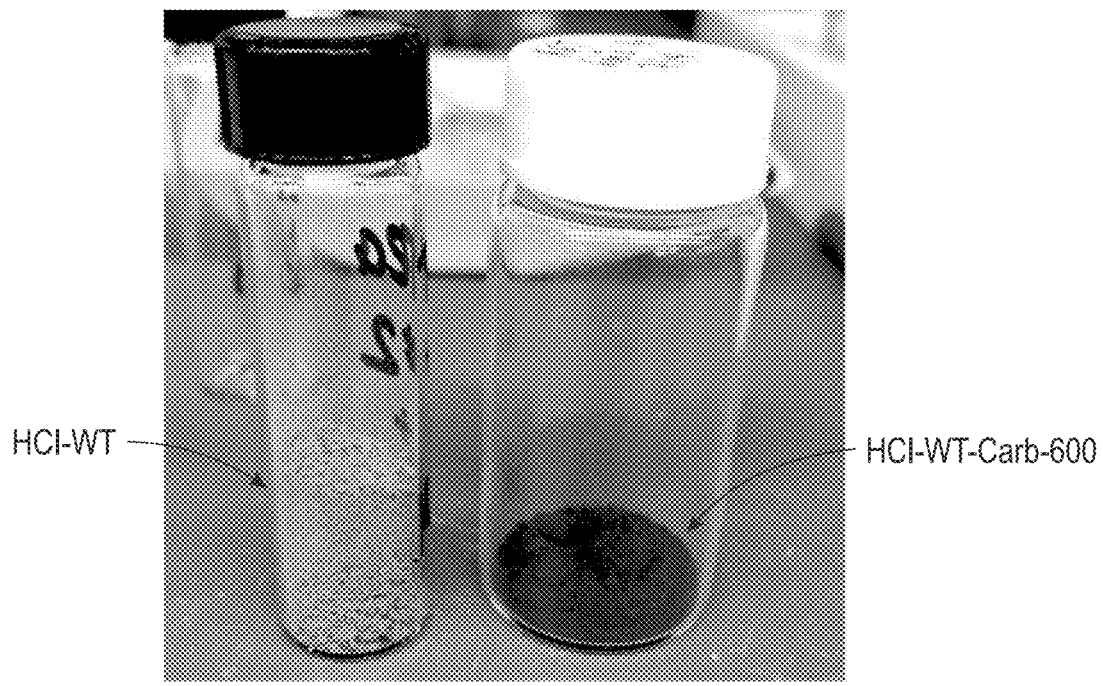
FIG. 11 is an image of a waste tea sample before and after carbonization in the Example.

FIG. 11 is the HCl-WT-Carb-600 sample before and after carbonization. In particular, the vial on the left has the HCl-WT prior to carbonization (i.e., prior to being subjected to the high temperature tube furnace as described). The vial on the right has HCl-WT after carbonization (i.e., after being subjected to the high temperature tube furnace as described) at 600° C. The vial on the right is labeled as HCl-WT-Carb-600 in which "Carb" means subjected to carbonization and "600" means carbonization at 600° C. Therefore, FIG. 1 gives a visual comparison between the HCl-treated waste tea (HCl-WT) (on the left) and the HCl-treated waste tea that has undergone carbonization at 600° C. (HCl-WT-Carb-600) (on the right).

Figure 12:
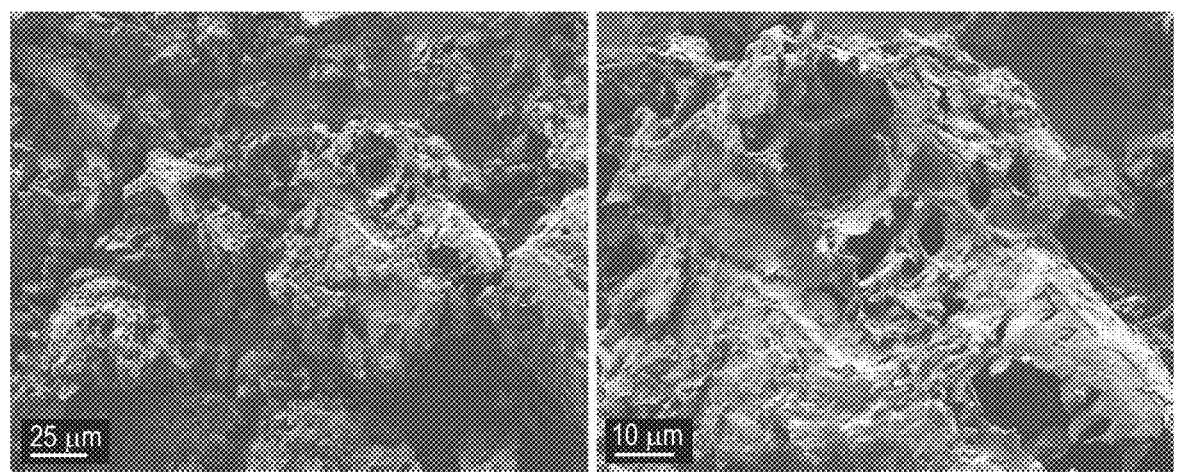
FIG. 12 is scanning electron microscope (SEM) images of a waste tea sample in the Example.
Figure 13:
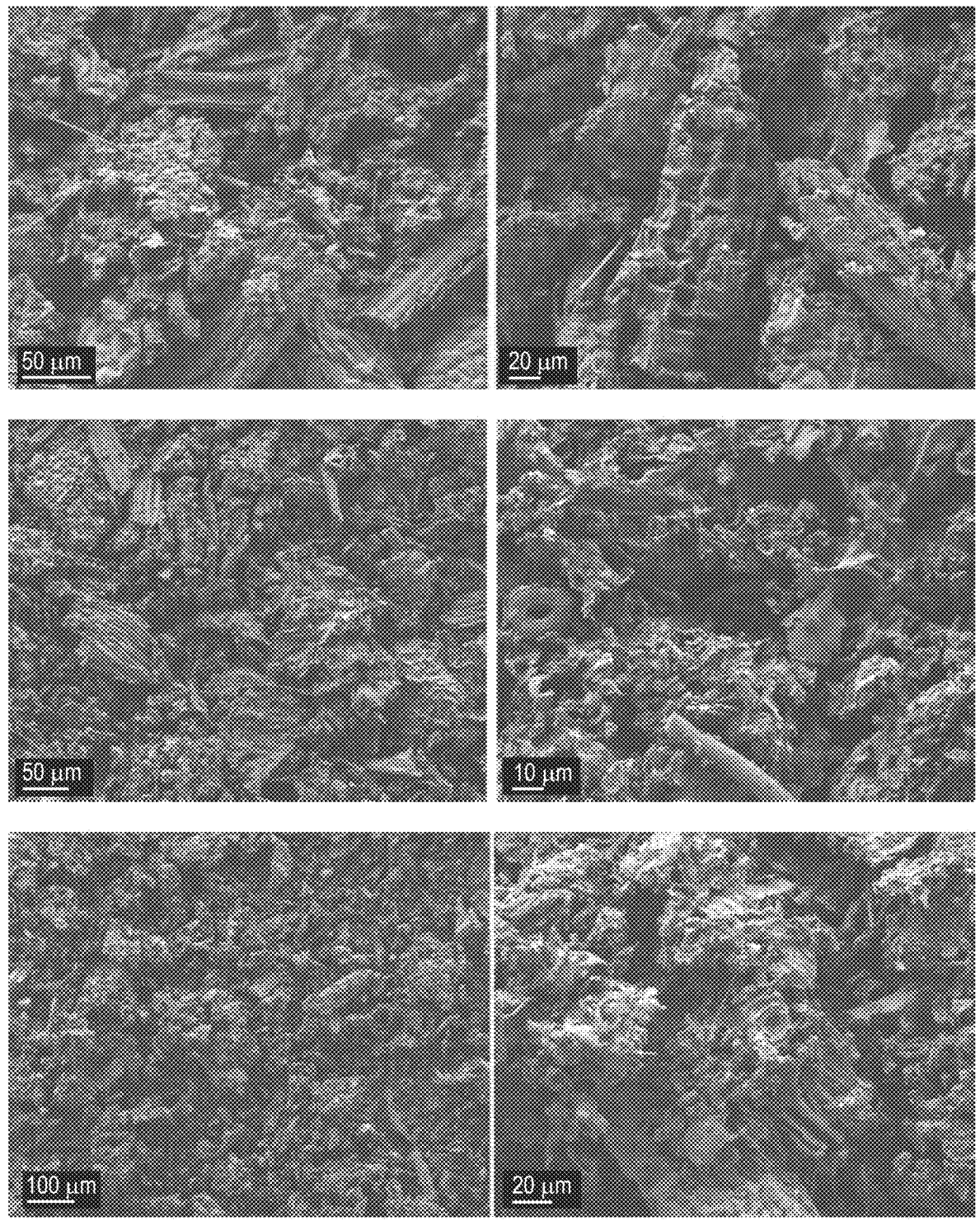
FIG. 13 is SEM images of waste tea samples in the Example after roasting at 200° C., 400° C., and 600° C., respectively.

The HCl-WT, the HCl-WT carbonized at 200° C. (HCl-WT-Carb-200), the HCl-WT carbonized at 400° C. (HCl-WT-Carb-400), and the HCl-WT-Carb-600 were all four subjected to characterization techniques to confirm their resemblance to organic matter. First, SEM imaging was performed on each of these four powders. The resulting images are shown in FIG. 12 and FIG. 13. FIG. 12 is SEM images of the HCl-WT.

FIG. 13 is SEM images of the HCl-WT after roasting at 200° C., 400° C., and 600° C., respectively. In particular, the top two images are HCl-WT-Carb-200, the middle two images are HCl-WT-Carb-400, and the bottom two images are HCl-WT-Carb-600. As the temperature for carbonization increased, the surface area of the resulting roasted tea samples increased.

FIGS. 12-17 collectively indicate a relationship between the H/C chemistry of roasted waste tea and the H/C chemistry of coal. The increase in carbon with increasing roasting (carbonization) temperatures of the waste tea results in loss of hydrogen similar to that of coal during maturation. Again, as the temperature for roasting (carbonization) increased with waste tea, the surface area of the resulting roasted (carbonized) waste tea samples increased, as indicated in FIGS. 12-13.

This observed variation in surface area is consistent with analysis via $CO_2$ gas sorption performed via a TGA instrument. In the $CO_2$ gas sorption analysis, TGA was generally not performed but instead $CO_2$ gas sorption analysis performed via the TGA instrument. Sorption may be a physical and chemical process by which one substance becomes attached to another. In this Example, the sorption is generally $CO_2$ gas adsorption, for instance, in which the surface area is occupied by $CO_2$ molecules. Sorption may include the physical adherence or bonding of ions and molecules onto the surface of another phase.

The TGA instrument used to perform the $CO_2$ gas sorption analysis was a thermogravimetric analyzer configured to measure mass of a sample while the temperature of the sample is changed over time. Here, this TGA instrument was utilized to determine (measure) the mass increase of the sample due to $CO_2$ gas sorption at constant temperature. For the $CO_2$ gas sorption analysis, the sample material was exposed to $CO_2$ flow, and the precision balance of the TGA instrument detected changes in mass associated with $CO_2$ sorption of the sample material (e.g., including $CO_2$ sorption to the surface of the sample material). For the TGA instrument, the precision balance may also be labeled as a sensitive balance or a thermobalance. The TGA instrument (thermogravimetric analyzer) included a crucible of the precision balance inside a furnace having a programmable temperature control. The crucible was a tared alumina-ceramic crucible.

For the four waste-tea sample powders, respectively, 10-15 mg of the tea sample powder was placed in the crucible and heated in the TGA instrument at 120° C. in $N_2$ gas flow (100 mL min$^{-1}$) for 10 minutes. A purpose of heating at 120° C. was to displace moisture from the sample. The $N_2$ gas flow at 120° C. was to drive off any residual water and gases that may have adsorbed before introducing the $CO_2$.

The temperature was then reduced to 40° C. under continuous $N_2$ flow. The atmosphere was then changed to pure $CO_2$ by flowing $CO_2$ at 100 mL min$^{-1}$ at approximately ambient pressure. The temperature was maintained at 40° C. The mass of the tea powder sample as measured by the precision balance was monitored as a function of time in order to determine the amount of $CO_2$ sorption.

Figure 14:
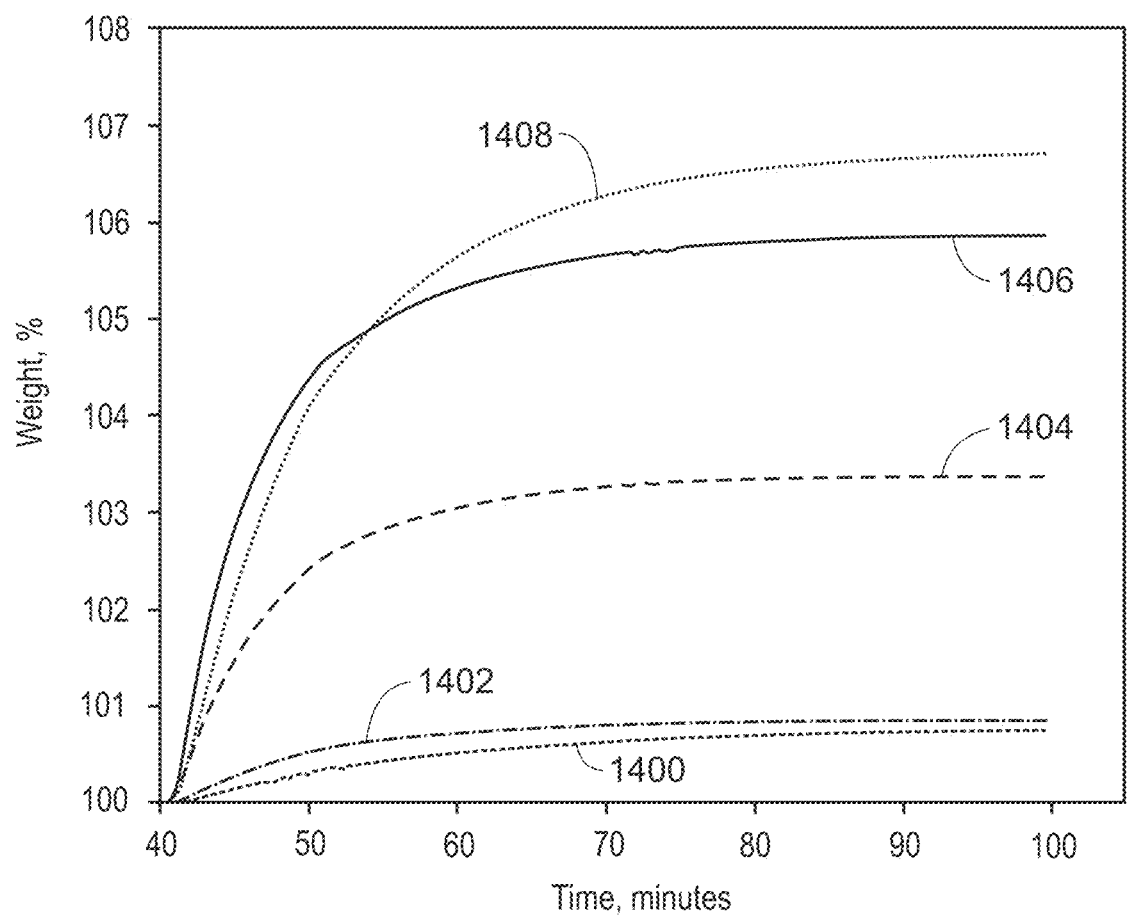
FIG. 14 is a plot depicting results of the carbon dioxide (CO2) gas sorption experiments of waste tea samples in the Example. The plot is a plot of weight % of the waste tea sample over time during the CO2 sorption.

FIG. 14 shows the results of the gas sorption experiments with the waste tea samples. The waste tea HCl-WT and HCl-WT-Carb-200 had low $CO_2$ sorption, while the waste tea HCl-WT-Carb-400 and HCl-WT-Carb-600 had significantly higher $CO_2$ sorption. FIG. 14 is a plot of weight % of the sample over time during the $CO_2$ sorption. Thus, the plot gives weight increase of each of the four tea samples over time during $CO_2$ sorption while flowing $CO_2$ gas over the sample at 40° C. For comparison, the plot includes a curve for activated carbon (as a crude form of graphite) during $CO_2$ sorption while flowing $CO_2$ gas over the sample of the activated carbon at 40° C. While the analysis was performed with the TGA instrument, the temperature was held constant during the sorption while collecting the data for the curves 1400, 1402, 1404, 1406, and 1408. The curve 1400 is for the HCl-WT. The curve 1402 is for the HCl-WT-Carb-200. The curve 1404 is for the HCl-WT-Carb-400. The curve 1406 is for the HCl-WT-Carb-600. Lastly, the curve 1408 is for the activated carbon that may be analogous to graphite. The increase in sorption (e.g., adsorption) by the tea with increasing roasting temperature can be associated with increasing carbon and the resulting increasing surface area. The % C of the tea samples the tea has been measured by pyrolysis and by gravimetric means.

Figure 15:
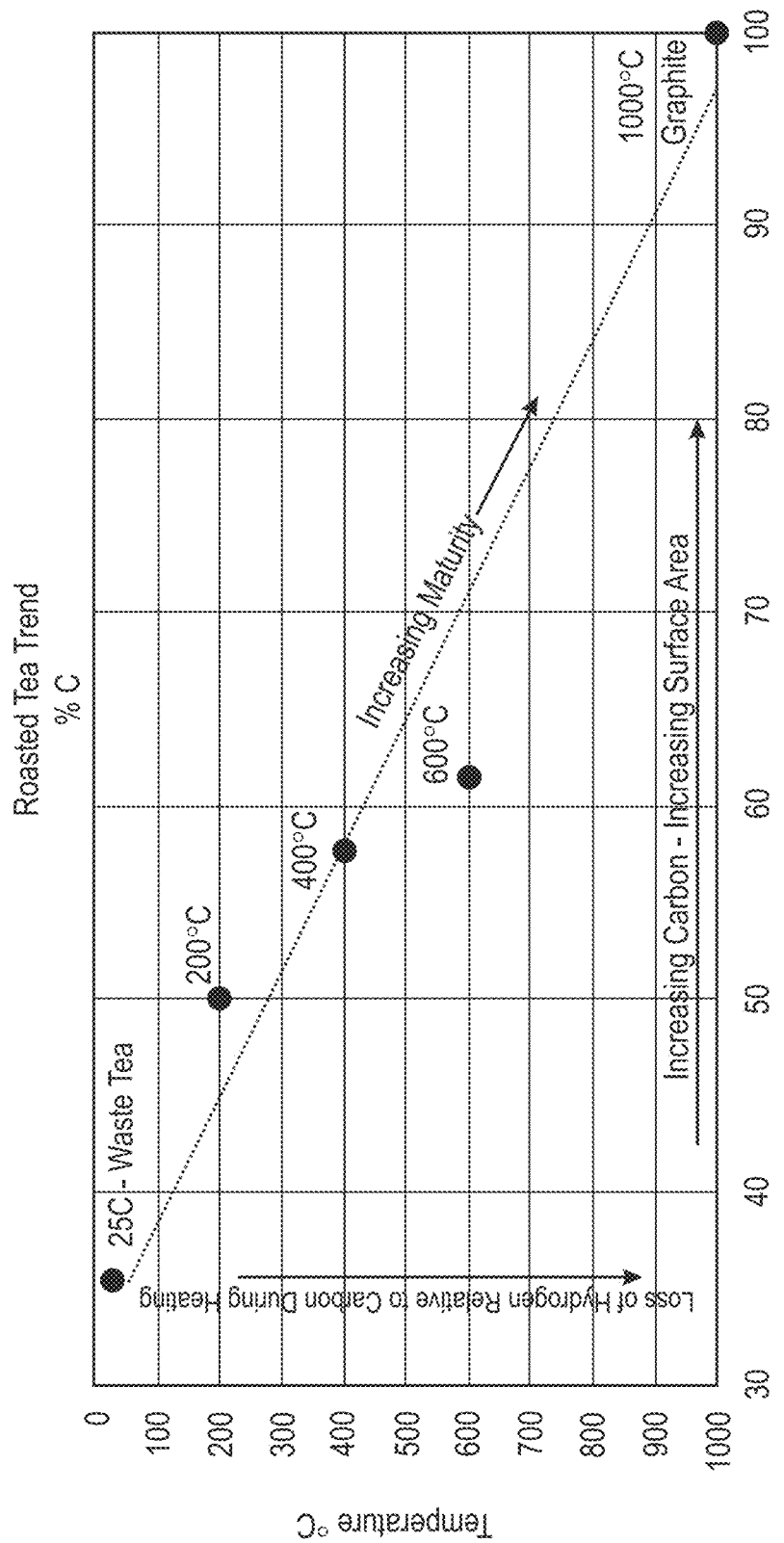
FIG. 15 is a plot of tea roasting temperature versus atomic-percent carbon (% C) in the waste tea sample in the Example.

FIG. 15 is a plot of tea roasting temperature versus atomic-percent carbon (% C) in the sample. The temperature of the waste tea prior to roasting is the ambient temperature at approximately 25° C. The depicted trends of loss of $H_2$ relative to carbon, increasing carbon, and increasing maturity may be analogous to that of both coal and kerogen. An equivalent temperature for roasting temperature for the activated carbon (labeled as graphite at approximately 100% C) is 1000° C. A line is approximately fitted with respect to the data points. The line is labeled as increasing maturity with a directional arrow in the label. Temperature of 1000° C. is among typical temperatures for forming graphene layers in organic carbon that are near the composition of graphite. Graphite composition is sheets of carbon approximated with the tea roasted at 1000° C.

Figure 16:
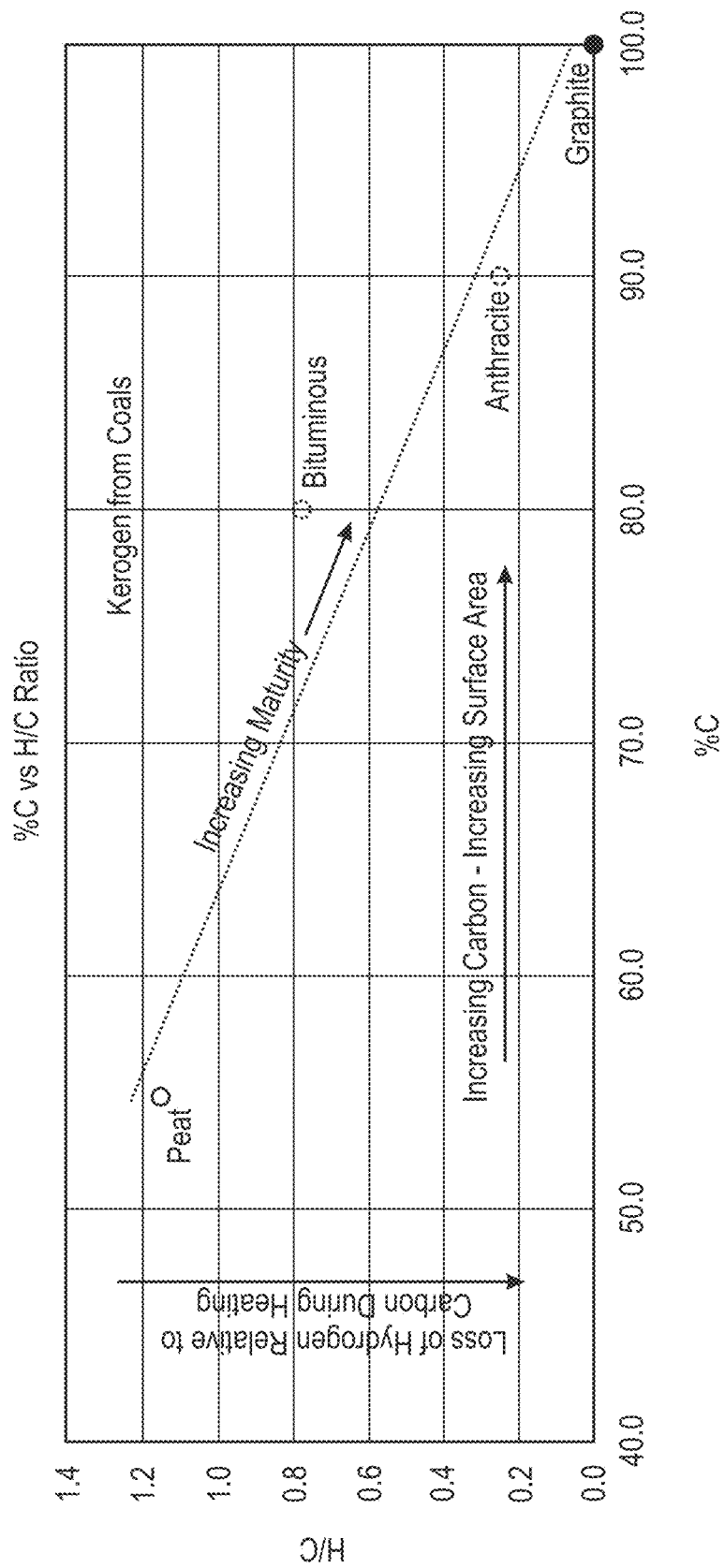
FIG. 16 is a plot of the H/C ratio versus atomic-percent carbon (% C) for coal (peat, bituminous, anthracite, and graphite) having different respective stages or characteristics of coal formation.
Figure 17:
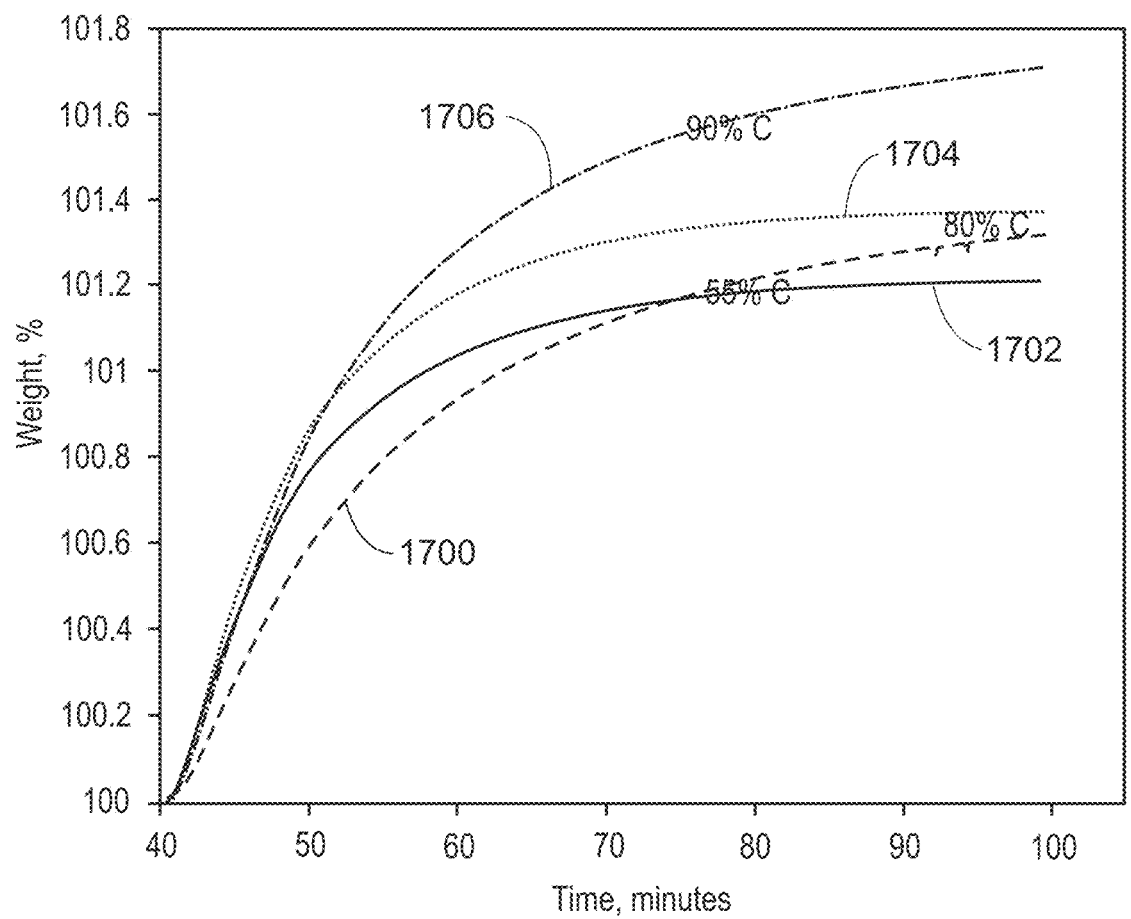
FIG. 17 is a plot of weight % of coal samples over time during CO2 sorption, as performed with the waste tea samples. The plot gives weight increase of each of four coal samples over time during CO2 sorption while flowing CO2 gas over the coal sample at 40° C.

The increase in sorption (e.g., adsorption) in the tea with increasing roasting temperature (as given in FIG. 14) along with the trends in FIG. 15 emulates the thermogenic transformation of kerogen into hydrocarbons. In the field, as the kerogen source is buried at a certain rate over time, the increasing heat flow from the subsurface starts to break the bonds of kerogen resulting in loss of hydrogen relative to carbon (H/C). That loss of hydrogen relative to carbon can be seen with coal, as indicated in FIGS. 16-17. The steady loss of hydrogen relative to carbon gives increasing surface area. This is demonstrated in FIGS. 16-17 by the adsorption [of $CO_2$ from peat with the highest H/C ratio but the lowest adsorption, as compared to anthracite that had the highest adsorption but the lowest H/C. This same behavior is observed as the waste tea (see FIGS. 14-15) is roasted from 200° C. to 600° C. with increasing temperatures. The increase in carbon from the pyrolysis (roasting, carbonization) is the result of the loss of the hydrogen relative to carbon, which also results in an increase in surface area. Note the progressive adsorption of $CO_2$ from waste tea (prior to roasting) compared to that of the waste tea roasted at 600° C. shows the surface area has also increased significantly by the thermogenic process. This increase in surface area is also evident from the SEM images in FIGS. 12-13.

FIG. 16 is a plot of the H/C ratio versus atomic-percent carbon (% C) for coal (peat, bituminous, anthracite, and graphite) having different respective stages or characteristics of coal formation. Peat is generally a soft, organic material consisting of partly decayed plant and mineral matter, and that can be characterized as a precursor to coal. Bituminous coal (black or dark brown) is an abundant coal that contains a tar-like substance called bitumen and that is typically hard but friable. Anthracite coal is hard and compact with relatively high carbon content and few impurities. Graphite is generally the most stable form of carbon and that can be labeled as meta-anthracite coal but is difficult to ignite. A line (labeled as increasing maturity with a directional arrow) is approximately fitted with respect to the data points.

FIG. 17 is a plot of weight % of coal samples over time during $CO_2$ sorption, as performed with the waste tea samples. The plot gives weight increase of each of four coal samples over time during $CO_2$ sorption while flowing $CO_2$ gas over the sample at 40° C. The curve 1700 is for peat. The curve 1702 is for a first sample of bituminous coal. The curve 1704 is for a second sample of bituminous coal. The curve 1706 is for anthracite. The trend in FIG. 17 between the coal types is associated with increasing adsorption due to increasing carbon as the result of the maturing of the coals. Three values for % C are depicted merely to show a general trend of decreasing and increasing % C and the corresponding adsorption recorded. The difference between the two bituminous coals (curves 1702, 1704) is related to the H/C ratio of their kerogen where the second sample (curve 1704) is more mature than the first sample (curve 1702).

Figure 18:
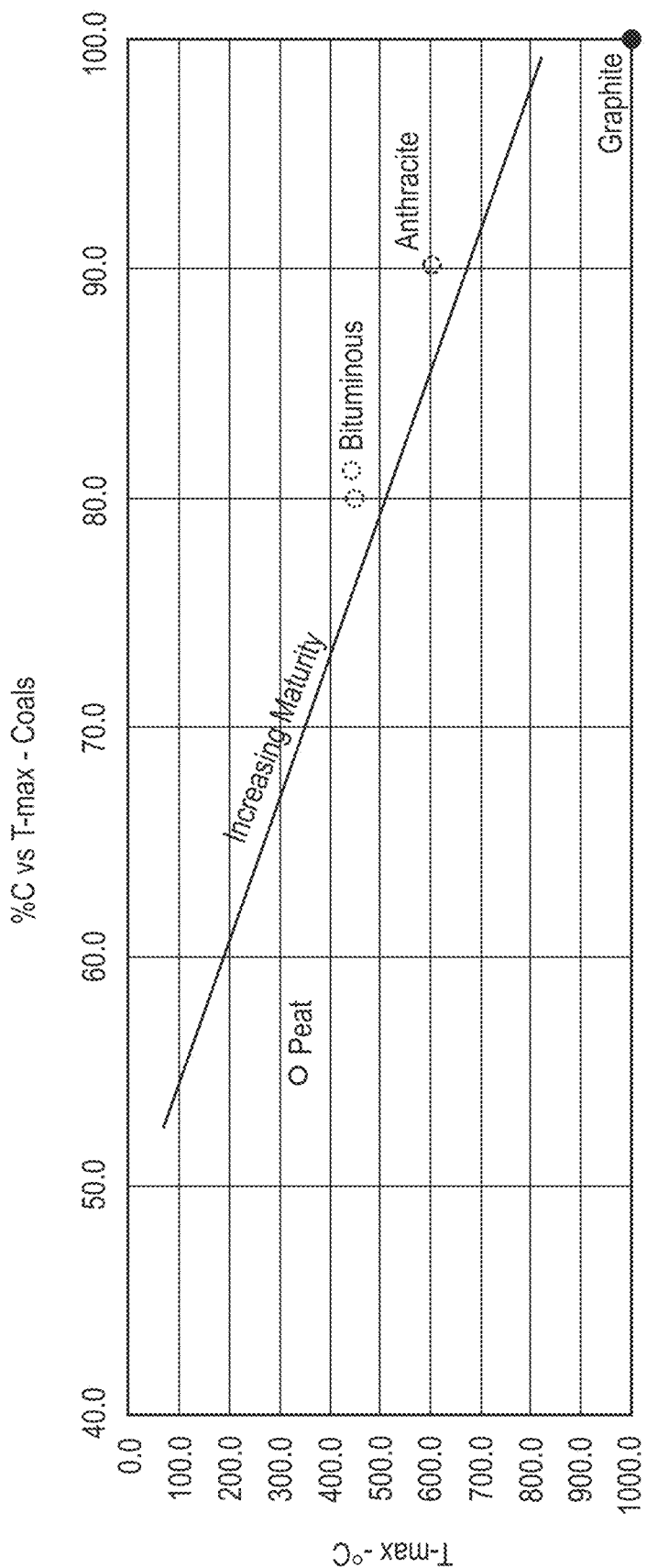
FIG. 18 is a plot of T-max (° C.) versus % C for peat, bituminous, anthracite, and graphite.

The roasting temperature range used to transform the tea can also coincide with maturity temperatures (T-max) of coal from pyrolysis compared to coal carbon chemistry measured by elemental analysis (see FIG. 18). FIG. 18 is a plot of T-max (° C.) versus % C for peat, bituminous, anthracite, and graphite. An increasing maturing line is approximately fitted through the data points. The T-max value recorded can be utilized to determine the maturity of the coal; thus the range, for example, from 200-600° C. for roasting the waste tea can be generally compatible for these maturity stages of coal in certain contexts.

A number of implementations have been described. Nevertheless, it will be understood that various modifications may be made without departing from the spirit and scope of the disclosure.

What is claimed is:

1. A method comprising:
   grinding tea leaves to give tea powder;
   subjecting the tea powder to thermal gravimetric analysis (TGA);
   roasting the tea powder at a roasting temperature to give roasted tea powder for inclusion in a synthetic source rock, wherein the roasting temperature is based at least in part on results of the TGA;
   determining composition of the roasted tea powder via elemental analysis; and
   determining porosity of the roasted tea powder.

2. The method of claim 1, wherein the composition comprises chemical composition.

3. The method of claim 1, comprising mixing the roasted tea powder with inorganic material comprising minerals.

4. The method of claim 1, comprising mixing the roasted tea powder with inorganic material comprising at least one of silicate, aluminosilicate, or carbonate.

5. A method of preparing synthetic source rock having tea, comprising:
   drying and grinding tea leaves to give tea powder;
   determining composition and porosity of the tea powder;
   roasting the tea powder at a roasting temperature to give a roasted tea powder;
   determining composition of the roasted tea powder via elemental analysis;
   determining porosity of the roasted tea powder; and
   forming a synthetic source rock comprising the roasted tea powder.

6. A method of preparing synthetic source rock having tea, comprising:
   grinding tea leaves to give tea powder;
   determining chemical composition of the tea powder via elemental analysis;
   determining porosity of the tea powder;
   specifying a roasting temperature via thermal gravimetric analysis (TGA) of the tea powder; and
   roasting the tea powder at the roasting temperature as specified to give a roasted tea powder.

7. The method of claim 6, comprising:
   drying the tea leaves at a temperature of at least 70° C., wherein the tea leaves comprise leaves of a *Camellia sinensis* plant; and
   filtering the tea powder via a sieve to remove particles from the tea powder.

8. The method of claim 7, wherein the particles comprise a particle size greater than 300 microns (μm).

9. The method of claim 6, comprising specifying porosity of the roasted tea powder.

10. The method of claim 6, comprising realizing a specified porosity of the roasted tea powder via specifying the roasting temperature.

11. The method of claim 6, comprising determining composition of the roasted tea powder via elemental analysis.

12. The method of claim 6, comprising drying the tea leaves under a vacuum in an oven for at least 12 hours at a temperature of at least 70° C.

13. The method of claim 6, wherein grinding the tea leaves comprises grinding the tea leaves via a ball mill.

14. A synthetic source rock comprising:
   roasted tea powder comprising a structure analogous to kerogen in a subterranean formation; and
   inorganic material comprising minerals.

15. The synthetic source rock of claim 14, wherein the roasted tea powder comprises tea leaves as ground and roasted, and wherein the synthetic source rock corresponds to actual source rock from the subterranean formation.

16. The synthetic source rock of claim 15, wherein the tea leaves comprise leaves of a *Camellia sinensis* plant.

* * * * *